United States Patent
Lei et al.

(10) Patent No.: US 12,477,494 B2
(45) Date of Patent: *Nov. 18, 2025

(54) OPEN LOOP TIMING CONTROL FOR 2-STEP RACH

(71) Applicant: QUALCOMM Incorporated, San Diego, CA (US)

(72) Inventors: Jing Lei, San Diego, CA (US); Hung Dinh Ly, San Diego, CA (US); Linhai He, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,339

(22) Filed: Oct. 31, 2022

(65) Prior Publication Data

US 2023/0217396 A1 Jul. 6, 2023

Related U.S. Application Data

(63) Continuation of application No. 16/736,394, filed on Jan. 7, 2020, now Pat. No. 11,490,346.

(Continued)

(51) Int. Cl.
*H04W 56/00* (2009.01)
*H04W 74/0836* (2024.01)

(52) U.S. Cl.
CPC ..... *H04W 56/0045* (2013.01); *H04W 56/001* (2013.01); *H04W 74/0836* (2024.01)

(58) Field of Classification Search
CPC ......... H04W 74/0833; H04W 74/0466; H04W 56/001; H04W 56/0045; H04W 80/02; H04W 72/0466; H04W 76/11
See application file for complete search history.

(56) References Cited

U.S. PATENT DOCUMENTS 10,999,846 B2  5/2021  Lunttila et al.
11,490,346 B2 * 11/2022  Lei ................... H04W 56/0045
(Continued)

FOREIGN PATENT DOCUMENTS

CN        109156034 A     1/2019
EP          3291628 A1    3/2018
WO    WO-2018054163 A1   3/2018

OTHER PUBLICATIONS

InterDigital Communications: "2-step Random Access Procedure", 3GPP Draft, R1-1700703, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 10, 2017 (Jan. 10, 2017), XP051203022, 4 pages, Section 2.

(Continued)

*Primary Examiner* — Redentor Pasia
(74) *Attorney, Agent, or Firm* — Paul M. McAdams; Norton Rose Fulbright US LLP

(57) ABSTRACT

In some aspects, a user equipment (UE) determines a transmission gap adjustment (TGA) for a first message (msgA) of a 2 step random access channel (RACH) procedure based on measurement of a reference signal transmitted by a base station as well as the radio resource configuration (RRC) configurations for msgA. In other aspects, a base station transmits a system information block (SIB) or RRC signaling that indicates at least one possible configuration of the TGA, and UEs determine the TGA depending on RRC state. Connected mode UEs having a timing alignment (TA) timer running may determine the TGA based on a previous TA. UEs in other RRC modes determine the TGA based on the possible configuration transmitted in the SIB or RRC signaling. Advantageously, 2 step RACH UEs are able to (Continued)

communicate with the base station without the closed loop TA information provided by a 4 step RACH.

33 Claims, 12 Drawing Sheets

Related U.S. Application Data

(60) Provisional application No. 62/800,282, filed on Feb. 1, 2019.

(56) References Cited

U.S. PATENT DOCUMENTS

| | | | |
|---|---|---|---|
| 2015/0049712 A1 | 2/2015 | Chen et al. | |
| 2017/0339712 A1 | 11/2017 | Rico Alvarino et al. | |
| 2019/0182814 A1* | 6/2019 | Shimezawa | H04L 5/0044 |
| 2019/0349983 A1* | 11/2019 | Loehr | H04W 72/23 |
| 2019/0363843 A1* | 11/2019 | Gordaychik | H04L 1/1835 |
| 2020/0029293 A1* | 1/2020 | Zhang | H04W 56/0005 |
| 2020/0053772 A1 | 2/2020 | Pan et al. | |
| 2020/0053779 A1* | 2/2020 | Jeon | H04B 17/318 |
| 2020/0059969 A1* | 2/2020 | Agiwal | H04W 72/23 |
| 2020/0100297 A1* | 3/2020 | Agiwal | H04W 52/365 |
| 2020/0100299 A1* | 3/2020 | Loehr | H04W 76/11 |
| 2020/0107369 A1* | 4/2020 | Jeon | H04W 74/006 |
| 2020/0107372 A1* | 4/2020 | Agiwal | H04W 24/08 |
| 2020/0137803 A1 | 4/2020 | Fakoorian et al. | |
| 2020/0146069 A1* | 5/2020 | Chen | H04B 17/327 |
| 2020/0187264 A1 | 6/2020 | Charbit et al. | |
| 2020/0235871 A1* | 7/2020 | Kim | H04W 56/0045 |
| 2020/0374911 A1 | 11/2020 | Lee et al. | |
| 2020/0404708 A1 | 12/2020 | Zhang et al. | |
| 2021/0029658 A1 | 1/2021 | Mahalingam et al. | |
| 2021/0058884 A1* | 2/2021 | Liu | H04J 3/06 |
| 2021/0136814 A1 | 5/2021 | You | |
| 2021/0168862 A1 | 6/2021 | Murray et al. | |
| 2021/0227577 A1* | 7/2021 | Yang | H04L 27/2607 |
| 2021/0243814 A1 | 8/2021 | Zhang et al. | |
| 2021/0360707 A1* | 11/2021 | Chen | H04W 74/0833 |
| 2022/0086786 A1* | 3/2022 | Narasimha | H04B 7/18506 |

OTHER PUBLICATIONS

International Search Report and Written Opinion—PCT/US2020/012772—ISA/EPO—Apr. 7, 2020.

International Preliminary Report on Patentability—PCT/US2020/012772, the International Bureau of WIPO—Geneva, Switzerland, Aug. 12, 2021.

Qualcomm Incorporated: "Channel Structure for Two-Step RACH", 3GPP TSG-RAN WG1 Meeting #96, R1-1902977, 3rd Generation Partnership Project, Mobile Competence Centre, 650, Route Des Lucioles, F-06921, Sophia-Antipolis Cedex, France, vol. RAN WG1, No. Athens, Greece, Feb. 25, 2019-Mar. 1, 2019, 10 Pages, Feb. 16, 2019, XP051600674, Proposal 5, p. 8.

ZTE Corporation, et al., "New Work Item: 2-Step RACH for NR", 3GPP Draft, 3GPP TSG RAN Meeting #82, RP-182894 New Work Item Proposal 2 Step RACH for NR, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 13, 2018 (Dec. 13, 2018), XP051575527, 5 pages, Section 3, Section 4.1.

Master's Theses: "The Research of RACH in the LTE", Random Access Technology, Feb. 28, 2007, Chapter 2, 60 Pages.

ETSI TS 138 133: "5G; NR; Requirements for support of radio resource management (3GPP TS 38.133 version 15.4.0 Release 15)", ETSI TS 138 133, V15.4.0, Apr. 2019, 868 Pages. Retrieved from the Internet:<URL: https://www.etsi.org/deliver/etsi_ts/138100_138199/138133/15.04.00_60/ts_138133v150400p.pdf> Section 7.1.2 and Table 7.1.2-2.

ETSI TS 138 300: "5G; NR; Overall Description; Stage-2(3GPP TS 38.300 version 15.4.0 Release 15)", V15.4.0 (Apr. 2019), 97 Pages. Retrieved from the Internet:< URL: https://www.etsi.org/deliver/etsi_ts/138300_138399/138331/15.04.00_60/ts_138331v150400p.pdf> Section 9.2.6.

ETSI TS 138.211: "5G, NR, Physical Channels and Modulation (3GPP TS 38.211 version 15.4.0 Release 15)", Apr. 2019, 98 Pages. Retrieved from the Internet:< URL: https://www.etsi.org/deliver/etsi_ts/138200_138299/138211/15.04.00_60/ts_138211v150400p.pdf> Section 4.3.1.

ETSI TS 138.213: "5G, NR, Physical Layer Procedures for Control (3GPP TS 38.213 Version 15.4.0 Release 15), TS 138.213 V 15.4.0", Apr. 2019, 106 Pages. Retrieved from the Internet:< URL: https://www.etsi.org/deliver/etsi_ts/138200_138299/138213/15.04.00_60/ts_138213v150400p.pdf> Section 4.2.

ETSI TS 138.331: "5G, NR, Radio Resource Control (RRC), Protocol Specification (3GPP TS 38.331 Version 15.4.0 Release 15)", ETSI TS 138.331, V15.4.0, Apr. 2019, 471 Pages. Retrieved from the Internet:<URL: https://www.etsi.org/deliver/etsi_ts/138300_138399/138331/15.26.00_60/ts_138331v152600p.pdf> Section 6.3.2, Subsection ServingCellConfigCommonSIB.

* cited by examiner

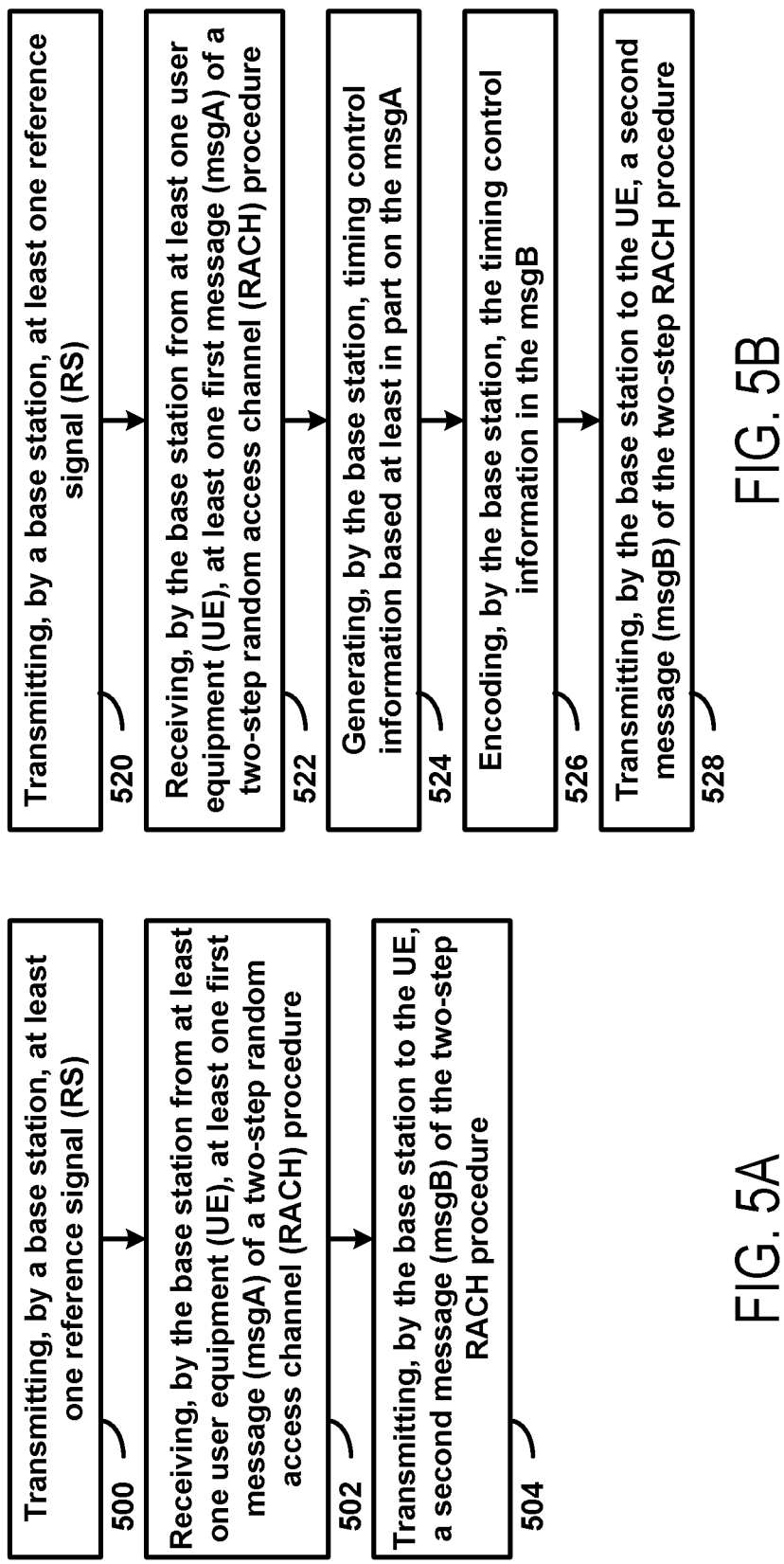

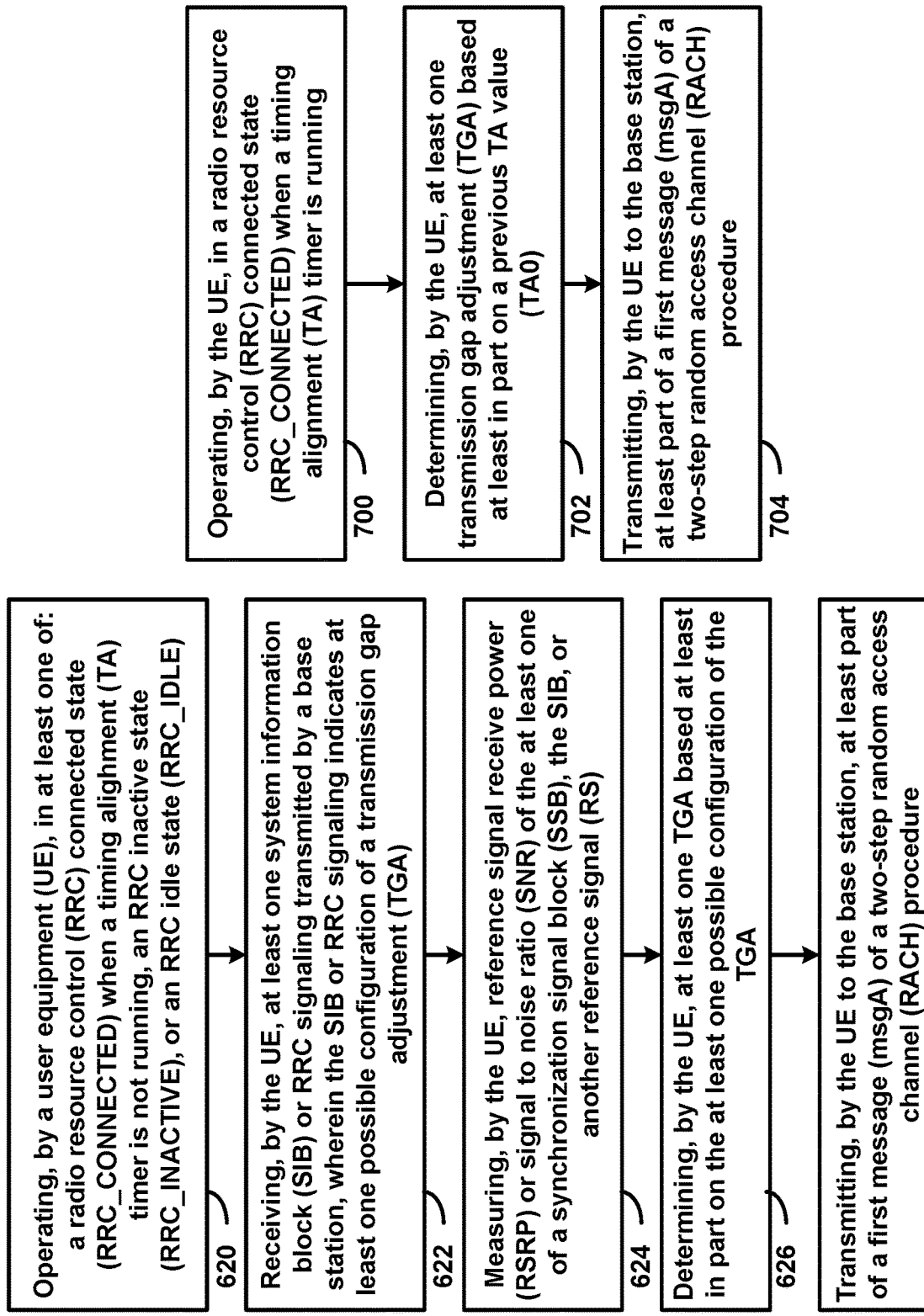

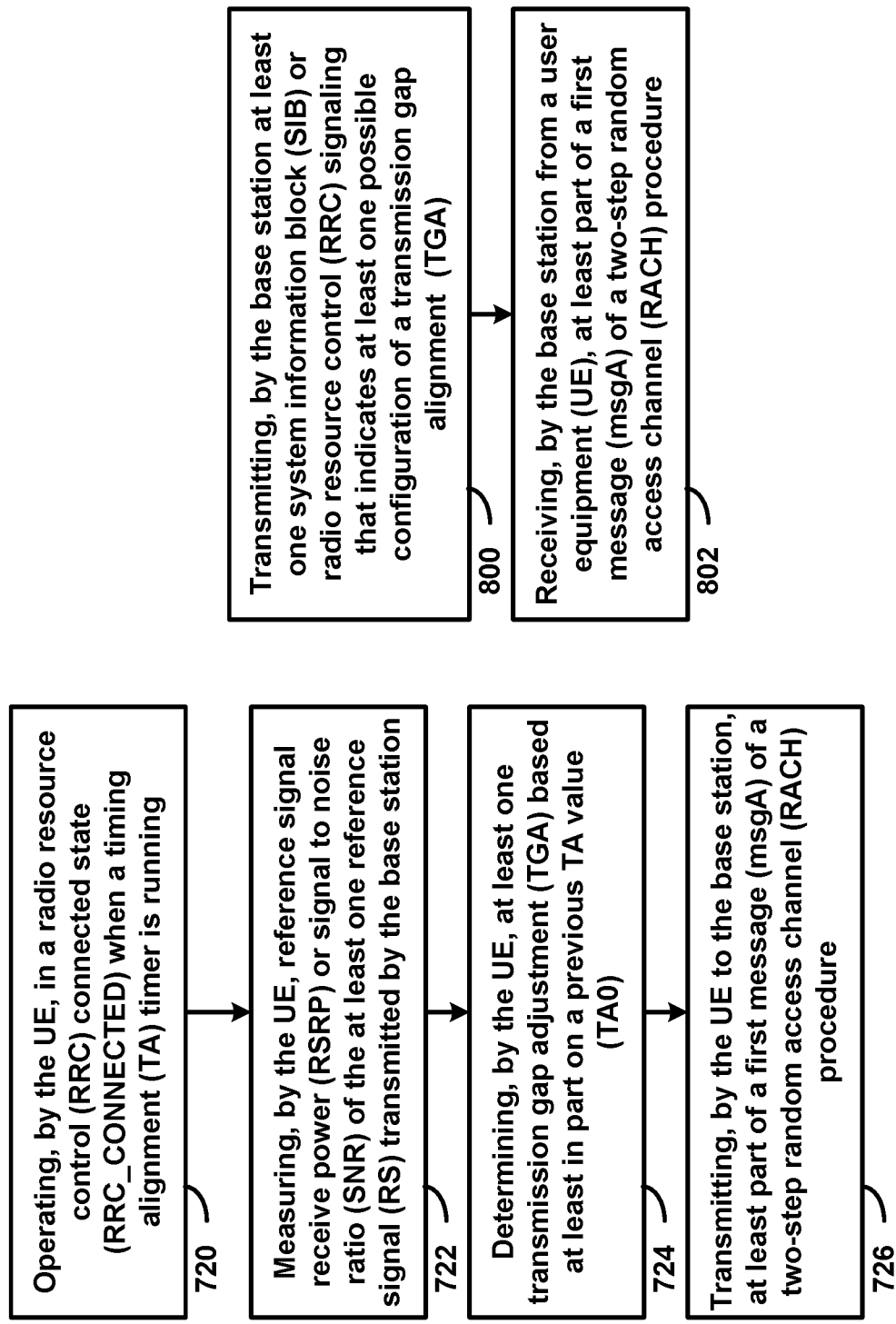

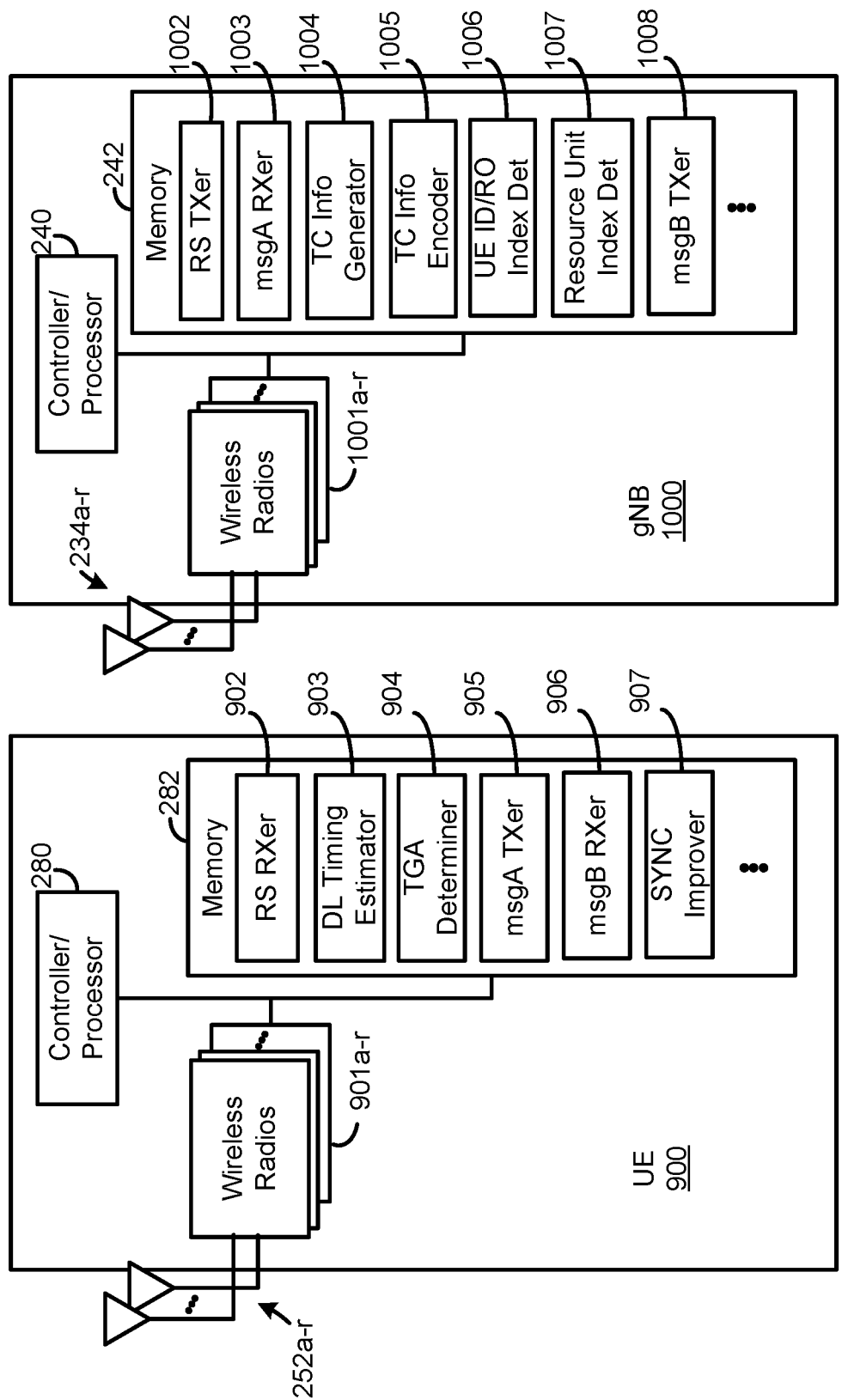

OPEN LOOP TIMING CONTROL FOR 2-STEP RACH

CROSS-REFERENCE TO RELATED APPLICATIONS

This application is a continuation and claims the benefit of U.S. patent application Ser. No. 16/736,394, entitled, "OPEN LOOP TIMING CONTROL FOR 2-STEP RACH," filed on Jan. 7, 2020, and also claims the benefit of U.S. Provisional Patent Application No. 62/800,282, entitled, "OPEN LOOP TIMING CONTROL FOR 2-STEP RACH," filed on Feb. 1, 2019, which is expressly incorporated by reference herein in its entirety.

TECHNICAL FIELD

Aspects of the present disclosure relate generally to wireless communication systems, and more particularly, to timing control for 2-step random access channel (RACH).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE, may receive data and control information on the uplink from the UE, or a combination thereof. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method for wireless communication by a user equipment (UE) includes receiving, by the UE, at least one reference signal (RS) transmitted by a base station. The method additionally includes estimating, by the UE, downlink (DL) timing of the base station based on the received at least one RS. The method also includes determining, by the UE, at least one transmission gap adjustment (TGA) based at least in part on the estimated DL timing. The method further includes transmitting, by the UE to the base station, at least part of a first message (msgA) of a two-step random access channel (RACH) procedure. The transmission of the msgA includes applying, by the UE, the at least one TGA to transmission of at least one of a preamble or a payload of the msgA.

In an aspect, a method for wireless communication by a base station includes transmitting, by the base station, at least one reference signal (RS). The method additionally includes receiving, by the base station from at least one user equipment (UE), at least one first message (msgA) of a two-step random access channel (RACH) procedure. The msgA includes a preamble and a payload. The at least one msgA indicates an application, by the at least one UE, of at least one transmission gap adjustment (TGA) to at least one of the preamble or the payload. The at least one TGA is determined based at least in part on an estimate of downlink (DL) timing based on the at least one RS. The method also includes transmitting, by the base station to the UE, a second message (msgB) of the two-step RACH procedure.

In an aspect, a method for wireless communication by a user equipment (UE) includes operating, by the UE, in at least one of: a radio resource control (RRC) connected state (RRC_CONNECTED) when a timing alignment (TA) timer is not running, an RRC inactive state (RRC_INACTIVE), or an RRC idle state (RRC_IDLE). The method additionally includes receiving, by the UE, at least one system information block (SIB) or RRC signaling transmitted by a base station, the SIB or RRC signaling indicating at least one possible configuration of a transmission gap adjustment (TGA). The method also includes determining, by the UE, at least one TGA based at least in part on the at least one possible configuration of the TGA. The method further includes transmitting, by the UE to the base station, at least part of a first message (msgA) of a two-step random access channel (RACH) procedure, including applying, by the UE, the at least one TGA to at least one of a preamble or a payload of the msgA.

In an aspect, a method for wireless communication by a user equipment (UE), includes operating, by the UE, in a radio resource control (RRC) connected state (RRC_CONNECTED) when a timing alignment (TA) timer is running. The method additionally includes determining, by the UE, at least one transmission gap adjustment (TGA) based at least in part on a previous TA value (TA0). The method also includes transmitting, by the UE to the base station, at least part of a first message (msgA) of a two-step random access channel (RACH) procedure, including applying, by the UE, the at least one TGA to transmission of at least one of a preamble or payload of the msgA.

In an aspect, a method for wireless communication by a base station includes transmitting, by the base station at least one system information block (SIB) or radio resource control (RRC) signaling that indicates at least one possible configuration of a transmission gap adjustment (TGA). The method additionally includes receiving, by the base station from a user equipment (UE), at least part of a first message (msgA) of a two-step random access channel (RACH) procedure. The transmission of the msgA indicates application of at least one TGA to transmission of at least one of a preamble or payload of the msgA. The at least one TGA is determined based at least in part on the at least one possible configuration of the TGA.

In an aspect, an apparatus for wireless communication has means for receiving, by a user equipment (UE), at least one reference signal (RS) transmitted by a base station. The apparatus additionally has means for estimating, by the UE, downlink (DL) timing of the base station based on the received at least one RS. The apparatus also has means for determining, by the UE, at least one transmission gap adjustment (TGA) based at least in part on the estimated DL timing. The apparatus further has means for transmitting, by the UE to the base station, at least part of a first message (msgA) of a two-step random access channel (RACH) procedure. The means for transmitting including means for applying, by the UE, the at least one TGA to transmission of at least one of a preamble or a payload of the msgA.

In an aspect, an apparatus for wireless communication has means for transmitting, by a base station, at least one reference signal (RS). The apparatus additionally has means for receiving, by the base station from at least one user equipment (UE), at least one first message (msgA) of a two-step random access channel (RACH) procedure. The msgA includes a preamble and a payload. The at least one msgA indicates an application, by the at least one UE, of at least one transmission gap adjustment (TGA) to at least one of the preamble or the payload. The at least one TGA is determined based at least in part on an estimate of downlink (DL) timing based on the at least one RS. The apparatus also has means for transmitting, by the base station to the UE, a second message (msgB) of the two-step RACH procedure.

In an aspect, an apparatus for wireless communication has means for operating, by a user equipment (UE), in at least one of: a radio resource control (RRC) connected state (RRC_CONNECTED) when a timing alignment (TA) timer is not running, an RRC inactive state (RRC_INACTIVE), or an RRC idle state (RRC_IDLE). The apparatus additionally has means for receiving, by the UE, at least one system information block (SIB) or RRC signaling transmitted by a base station. The SIB or RRC signaling indicates at least one possible configuration of a transmission gap adjustment (TGA). The apparatus also has means for determining, by the UE, at least one TGA based at least in part on the at least one possible configuration of the TGA. The apparatus further has means for transmitting, by the UE to the base station, at least part of a first message (msgA) of a two-step random access channel (RACH) procedure, including means for applying, by the UE, the at least one TGA to at least one of a preamble or a payload of the msgA.

In an aspect, an apparatus for wireless communication has means for operating, by a user equipment (UE), in a radio resource control (RRC) connected state (RRC_CONNECTED) when a timing alignment (TA) timer is running. The apparatus additionally has means for determining, by the UE, at least one transmission gap adjustment (TGA) based at least in part on a previous TA value (TA0). The apparatus also has means for transmitting, by the UE to the base station, at least part of a first message (msgA) of a two-step random access channel (RACH) procedure, includ-ing means for applying, by the UE, the at least one TGA to transmission of at least one of a preamble or payload of the msgA.

In an aspect, an apparatus for wireless communication has means for transmitting, by a base station, at least one system information block (SIB) or radio resource control (RRC) signaling that indicates at least one possible configuration of a transmission gap adjustment (TGA). The apparatus additionally has means for receiving, by the base station from a user equipment (UE), at least part of a first message (msgA) of a two-step random access channel (RACH) procedure. The transmission of the msgA indicates application of at least one TGA to transmission of at least one of a preamble or payload of the msgA. The at least one TGA is determined based at least in part on the at least one possible configuration of the TGA.

In an aspect, an apparatus for wireless communication has at least one computer processor and at least one memory coupled to the at least one computer processor. The at least one computer processor is configured to receive, by a user equipment (UE), at least one reference signal (RS) transmitted by a base station. The at least one computer processor is additionally configured to estimate, by the UE, downlink (DL) timing of the base station based on the received at least one RS. The at least one computer processor is also configured to determine, by the UE, at least one transmission gap adjustment (TGA) based at least in part on the estimated DL timing. The at least one computer processor is further configured to transmit, by the UE to the base station, at least part of a first message (msgA) of a two-step random access channel (RACH) procedure, including applying, by the UE, the at least one TGA to transmission of at least one of a preamble or a payload of the msgA.

In an aspect, an apparatus for wireless communication has at least one computer processor and at least one memory coupled to the at least one computer processor. The at least one computer processor is configured to transmit, by a base station, at least one reference signal (RS). The at least one computer processor is additionally configured to receive, by the base station from at least one user equipment (UE), at least one first message (msgA) of a two-step random access channel (RACH) procedure. The msgA includes a preamble and a payload, and the at least one msgA indicates an application, by the at least one UE, of at least one transmission gap adjustment (TGA) to at least one of the preamble or the payload. The at least one TGA is determined based at least in part on an estimate of downlink (DL) timing based on the at least one RS. The at least one computer processor is further configured to transmit, by the base station to the UE, a second message (msgB) of the two-step RACH procedure.

In an aspect, an apparatus for wireless communication has at least one computer processor and at least one memory coupled to the at least one computer processor. The at least one computer processor is configured to operate, by a user equipment (UE), in at least one of a radio resource control (RRC) connected state (RRC_CONNECTED) when a timing alignment (TA) timer is not running, an RRC inactive state (RRC_INACTIVE), or an RRC idle state (RRC_IDLE). The at least one computer processor is additionally configured to receive, by the UE, at least one system information block (SIB) or RRC signaling transmitted by a base station, the SIB indicating at least one possible configuration of a transmission gap adjustment (TGA). The at least one computer processor is also configured to determine, by the UE, at least one TGA based at least in part on the at least one possible configuration of the TGA. The at least one computer processor is further configured to transmit, by the UE to the base station, at least part of a first message (msgA) of a two-step random access channel (RACH) procedure, including applying, by the UE, the at least one TGA to at least one of a preamble or a payload of the msgA.

In an aspect, an apparatus for wireless communication has at least one computer processor and at least one memory coupled to the at least one computer processor. The at least one computer processor is configured to operate, by a user equipment (UE), in a radio resource control (RRC) connected state (RRC_CONNECTED) when a timing alignment (TA) timer is running. The at least one computer processor is additionally configured to determine, by the UE, at least one transmission gap adjustment (TGA) based at least in part on a previous TA value (TA0). The at least one computer processor is also configured to transmit, by the UE to the base station, at least part of a first message (msgA) of a two-step random access channel (RACH) procedure, including applying, by the UE, the at least one TGA to transmission of at least one of a preamble or payload of the msgA.

In an aspect, an apparatus for wireless communication has at least one computer processor and at least one memory coupled to the at least one computer processor. The at least one computer processor is configured to transmit, by a base station, at least one system information block (SIB) or radio resource control (RRC) signaling that indicates at least one possible configuration of a transmission gap adjustment (TGA). The at least one computer processor is also configured to receive, by the base station from a user equipment (UE), at least part of a first message (msgA) of a two-step random access channel (RACH) procedure. The transmission of the msgA indicates application of at least one TGA to transmission of at least one of a preamble or payload of the msgA. The at least one TGA is determined based at least in part on the at least one possible configuration of the TGA.

In an aspect, a computer-readable medium having instructions recorded thereon that, when enacted by at least one computer processor, cause the at least one computer processor to receive, by a user equipment (UE), at least one reference signal (RS) transmitted by a base station. The instructions additionally cause the at least one computer processor to estimate, by the UE, downlink (DL) timing of the base station based on the received at least one RS. The instructions also cause the at least one computer processor to determine, by the UE, at least one transmission gap adjustment (TGA) based at least in part on the estimated DL timing. The instructions further cause the at least one computer processor to transmit, by the UE to the base station, at least part of a first message (msgA) of a two-step random access channel (RACH) procedure, including applying, by the UE, the at least one TGA to transmission of at least one of a preamble or a payload of the msgA.

In an aspect, a computer-readable medium has instructions recorded thereon that, when enacted by at least one computer processor, cause the at least one computer processor to transmit, by a base station, at least one reference signal (RS). The instructions additionally cause the at least one computer processor to receive, by the base station from at least one user equipment (UE), at least one first message (msgA) of a two-step random access channel (RACH) procedure. The msgA includes a preamble and a payload. The at least one msgA indicates an application, by the at least one UE, of at least one transmission gap adjustment (TGA) to at least one of the preamble or the payload. The at least one TGA is determined based at least in part on an estimate of downlink (DL) timing based on the at least one RS. The instructions also cause the at least one computer processor to transmit, by the base station to the UE, a second message (msgB) of the two-step RACH procedure.

In an aspect, a computer-readable medium has instructions recorded thereon that, when enacted by at least one computer processor, cause the at least one computer processor to operate, by a user equipment (UE), in at least one of: a radio resource control (RRC) connected state (RRC_CONNECTED) when a timing alignment (TA) timer is not running, an RRC inactive state (RRC_INACTIVE), or an RRC idle state (RRC_IDLE). The instructions additionally cause the at least one computer processor to receive, by the UE, at least one system information block (SIB) or RRC signaling transmitted by a base station, the SIB indicating at least one possible configuration of a transmission gap adjustment (TGA). The instructions also cause the at least one computer processor to determine, by the UE, at least one TGA based at least in part on the at least one possible configuration of the TGA. The instructions further cause the at least one computer processor to transmit, by the UE to the base station, at least part of a first message (msgA) of a two-step random access channel (RACH) procedure, including applying, by the UE, the at least one TGA to at least one of a preamble or a payload of the msgA.

In an aspect, a computer-readable medium has instructions recorded thereon that, when enacted by at least one computer processor, cause the at least one computer processor to operate, by a user equipment (UE), in a radio resource control (RRC) connected state (RRC_CONNECTED) when a timing alignment (TA) timer is running. The instructions additionally cause the at least one computer processor to determine, by the UE, at least one transmission gap adjustment (TGA) based at least in part on a previous TA value (TA0). The instructions also cause the at least one computer processor to transmit, by the UE to the base station, at least part of a first message (msgA) of a two-step random access channel (RACH) procedure, including applying, by the UE, the at least one TGA to transmission of at least one of a preamble or payload of the msgA.

In an aspect, a computer-readable medium has instructions recorded thereon that, when enacted by at least one computer processor, cause the at least one computer processor to transmit, by a base station, at least one system information block (SIB) or radio resource control (RRC) signaling that indicates at least one possible configuration of a transmission gap adjustment (TGA). The instructions additionally cause the at least one computer processor to receive, by the base station from a user equipment (UE), at least part of a first message (msgA) of a two-step random access channel (RACH) procedure. The transmission of the msgA indicates application of at least one TGA to transmission of at least one of a preamble or payload of the msgA. The at least one TGA is determined based at least in part on the at least one possible configuration of the TGA.

Other aspects, features, and implementations of the present disclosure will become apparent to a person having ordinary skill in the art, upon reviewing the following description of specific, example implementations of the present disclosure in conjunction with the accompanying figures. While features of the present disclosure may be discussed relative to particular implementations and figures below, all implementations of the present disclosure can include one or more of the advantageous features discussed herein. In other words, while one or more implementations may be discussed as having particular advantageous features, one or more of such features may also be used in accordance with the various implementations of the disclosure discussed herein. In similar fashion, while example implementations may be discussed below as device, system, or method implementations it should be understood that such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5A is a block diagram illustrating example blocks of a wireless communication process carried out by a base station operating in accordance with open loop timing control according to some implementations of the present disclosure.

FIG. 5B is a block diagram illustrating example blocks of a wireless communication process carried out by a base station operating in accordance with open loop timing control according to some implementations of the present disclosure.

FIG. 6B is a block diagram illustrating example blocks of a wireless communication process carried out by a UE operating in accordance with open loop timing control according to some implementations of the present disclosure.

FIG. 7A is a block diagram illustrating example blocks of a wireless communication process carried out by a UE operating in accordance with open loop timing control according to some implementations of the present disclosure.

FIG. 7B is a block diagram illustrating example blocks of a wireless communication process carried out by a UE operating in accordance with open loop timing control according to some implementations of the present disclosure.

FIG. 8A is a block diagram illustrating example blocks of a wireless communication process carried out by a base station operating in accordance with open loop timing control according to some implementations of the present disclosure.

FIG. 9 is a block diagram illustrating example components of a user equipment (UE) carried out by a base station operating in accordance with open loop timing control according to some implementations of the present disclosure.

FIG. 10 is a block diagram illustrating example components of a base station according to some implementations of the present disclosure.

DETAILED DESCRIPTION

Figure 1:
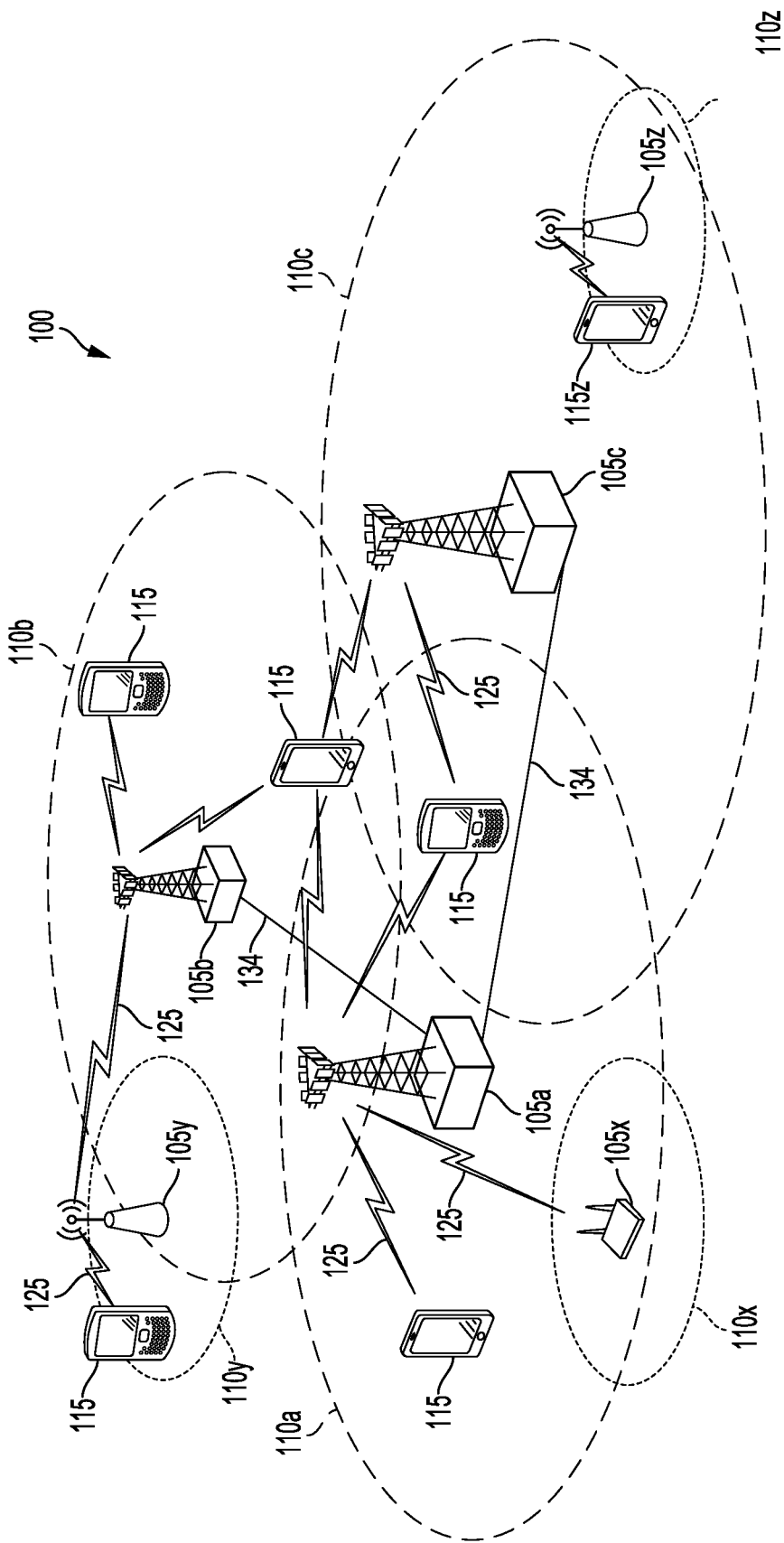
FIG. 1 is a block diagram illustrating details of a wireless communication system according to some implementations of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to a person having ordinary skill in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, one or more other networks, or a combination thereof. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, particular aspects of the apparatus and techniques may be described below with reference to example LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, a person having ordinary skill in the art will understand that additional implementations and use cases may come about in many different arrangements and scenarios. Innovations described herein may be implemented across many differing platform types, devices, systems, shapes, sizes, packaging arrangements. For example, implementations, uses, or a combination thereof may come about via integrated chip implementations, other non-module-component based devices (for example, end-user devices, vehicles, communication devices, computing devices, industrial equipment, retail/purchasing devices, medical devices, AI-enabled devices, etc.), or a combination thereof. While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also include additional components and features for implementation and practice of claimed and described implementations. It is intended that innovations described herein may be practiced in a wide variety of implementations, including both large/small devices, chip-level components, multi-component systems (for example RF-chain, communication interface, processor), distributed arrangements, end-user devices, etc. of varying sizes, shapes, and constitution.

In some aspects, a user equipment (UE) determines a transmission gap adjustment (TGA) (for example, a positive timing adjustment or a negative timing adjustment) for a first message (msgA) of a 2 step random access channel (RACH) based on measurement of a reference signal transmitted by a base station. In other aspects, a base station transmits a system information block (SIB) that indicates at least one possible configuration of the TGA, and UEs determine the TGA depending on radio resource configuration (RRC) state. Connected mode UEs having a TA timer running may determine the TGA based on a previous TA. UEs in other RRC modes determine the TGA based on the possible configuration transmitted in the SIB. Advantageously, 2 step RACH UEs are able to communicate with a base station without the closed loop TA information provided by a 4 step RACH. As such, the present disclosure provides solutions to the problem of a 2 step RACH UE communicating with a base station when the closed loop TA information provided in a 4 step RACH is not available.

FIG. 1 is a block diagram illustrating details of a wireless communication system according to some implementations of the present disclosure. FIG. 1 shows wireless network 100 for communication according to some implementations. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by a person having ordinary skill in the art, components appearing in FIG. 1 are likely to have related counterparts in other network arrangements including, for example, cellular-style network arrangements and non-cellular-style-network arrangements (for example, device to device or peer to peer or ad hoc network arrangements, etc.).

Turning back to FIG. 1 wireless network 100 includes a number of base stations, such as may include evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB, a gNB subsystem serving the coverage area, or a combination thereof, depending on the context in which the term is used. In implementations of wireless network 100 herein, gNBs 105 may be associated with a same operator or different operators (for example, wireless network 100 may include a plurality of operator wireless networks), and may provide wireless communications using one or more of the same frequencies (for example, one or more frequency band in licensed spectrum, unlicensed spectrum, or a combination thereof) as a neighboring cell.

A gNB may provide communication coverage for a macro cell or a small cell, such as a pico cell or a femto cell, other types of cell, or a combination thereof. A macro cell generally covers a relatively large geographic area (for example, several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (for example, a home) and, in addition to unrestricted access, may also provide restricted access by UEs having an association with the femto cell (for example, UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (for example, two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by a person having ordinary skill in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (for example, MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (for example, communication links 125) indicates wireless transmissions between a UE and a serving gNB, which is a gNB designated to serve the UE on the downlink, uplink, or combination thereof, or desired transmission between gNBs. Although backhaul communication 134 is illustrated as wired backhaul communications that may occur between gNBs, it should be appreciated that backhaul communications may additionally or alternatively be provided by wireless communications.

Figure 2:
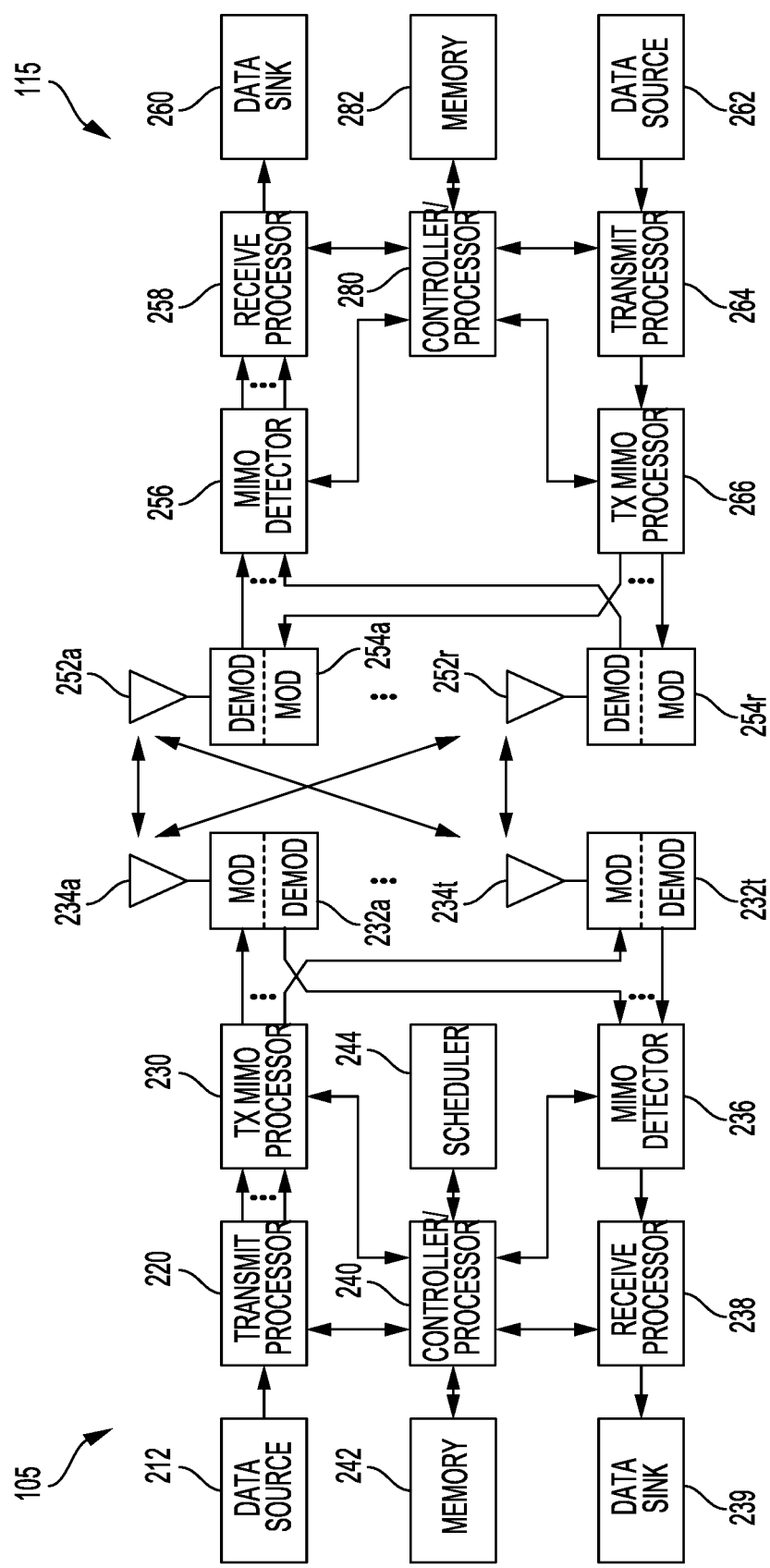
FIG. 2 is a block diagram conceptually illustrating a design of a base station/gNB and a user equipment (UE) configured according to some implementations of the present disclosure.

FIG. 2 is a block diagram conceptually illustrating a design of a base station/gNB 105 and a user equipment (UE) 115 configured according to some implementations of the present disclosure. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (for example, encode and symbol map) the data and control information to obtain data symbols and control symbols, respectively. Transmit processor 220 may also generate reference symbols, for example, for the primary synchronization signal (PSS), secondary synchronization signal (SSS), and cell-specific reference signal (CRS). Transmit (TX) multiple-input multiple-output (MIMO) processor 230 may perform spatial processing (for example, precoding) on the data symbols, the control symbols, reference symbols, or a combination thereof, if applicable, and may provide output symbol streams to modulators (MODs) 232a through 232t. Each modulator 232 may process a respective output symbol stream (for example, for OFDM, etc.) to obtain an output sample stream. Each modulator 232 may additionally or alternatively process (for example, convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (for example, filter, amplify, downconvert, and digitize) a respective received signal to obtain input samples. Each demodulator 254 may further process the input samples (for example, for OFDM, etc.) to obtain received symbols. MIMO detector 256 may obtain received symbols from all demodulators 254a through 254r, perform MIMO detection on the received symbols if applicable, and provide detected symbols. Receive processor 258 may process (for example, demodulate, deinterleave, and decode) the detected symbols, provide decoded data for UE 115 to data sink 260, and provide decoded control information to controller/processor 280.

On the uplink, at UE 115, transmit processor 264 may receive and process data (for example, for the PUSCH) from data source 262 and control information (for example, for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (for example, for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240, other processors and modules at gNB 105, controllers/processor 280, other processors and modules at UE 115, or any combination thereof may perform or direct the execution of various processes for the techniques described herein, such as to perform or direct the execution illustrated in FIGS. 3A, 3B, 3C, 4A, 4B, 5A, 5B, 5C, 6A, 6B, 7A, 7B, 8A, 8B, and 8C, other processes for the techniques described herein, or any combination thereof. Memories 242 and 282 may store data and program codes for gNB 105 and UE 115, respectively. Scheduler 244 may schedule UEs for data transmission on the downlink, uplink, or a combination thereof.

Figure 3B:
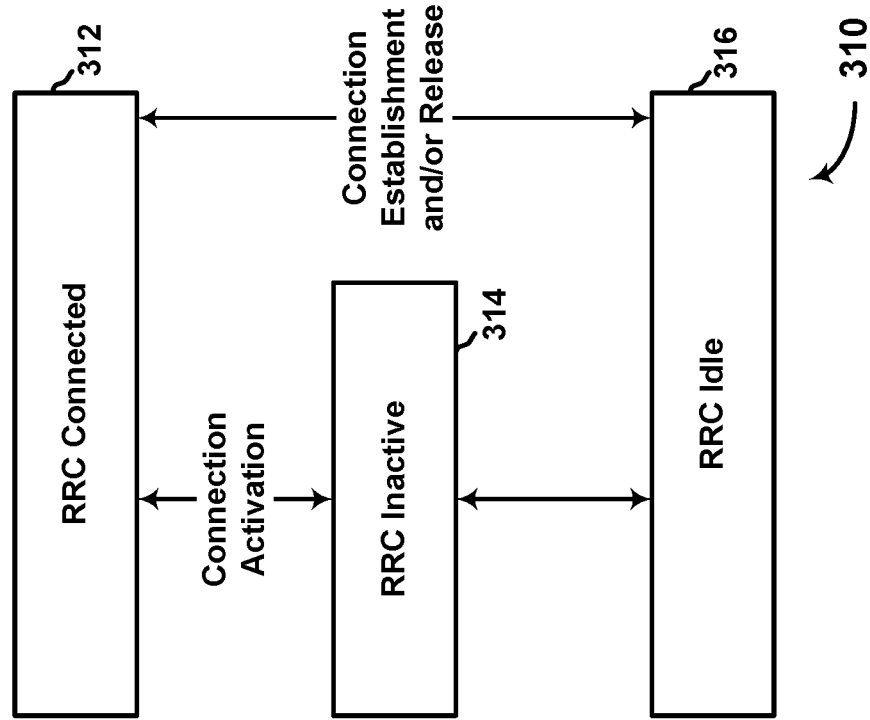
FIG. 3B is a block diagram illustrating radio resource control (RRC) states for a UE according to some implementations of the present disclosure.
Figure 3A:
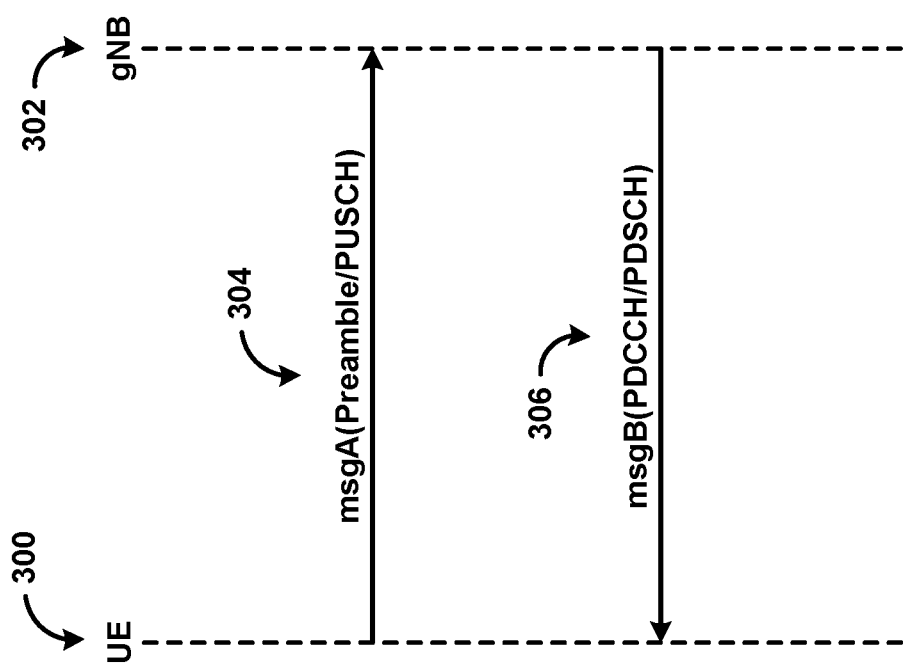
FIG. 3A is a block diagram illustrating 2-step random access channel (RACH) according to some implementations of the present disclosure.

FIG. 3A is a block diagram illustrating 2-step random access channel (RACH) according to some implementations of the present disclosure. 2-step random access channel (RACH) has become a new work item for Rel-16 New Radio (NR), which is applicable to any cell size supported in Rel-15 NR and all RRC states, whether or not the UE 300 has valid timing advance (TA). The 2-step RACH includes both a msgA 304 transmission from the UE 300 to the gNB 302, and a msgB 306 transmission from the gNB 302 to the UE 30. The components of msgA 304 include at least a physical RACH (PRACH) preamble and a physical uplink shared channel (PUSCH). The components of msgB 306 include at least a physical downlink control channel (PDCCH) and a (physical downlink shared channel) PDSCH. 2-step RACH is different from the 4-step RACH specified in NR Rel-15 in at least the fact that the first transmission of msgA 304 cannot leverage the TA information indicated by the network according to 4-step RACH. That is the TA command in msgB of the 4-step RACH is provided as closed loop timing control information, while transmission gap adjustment (TGA) implemented according to aspects of the present disclosure provides open loop timing control.

One or more parameters may be defined with respect to a msgA PUSCH configuration of implementations. For example, parameters defined with respect to a msgA PUSCH configuration may include one or more of a number of slots (for example, in active uplink bandwidth part numerology) containing one or multiple paging occasions (POs), a number of POs in each slot, start and length indicator value (SLIV) based indication of the start symbol of the first PO in each slot and the number of occupied symbols of each PO in time domain, PUSCH mapping type, configurable guard period (for example, in the unit of symbols), frequency start point (for example, with respect to the first physical resource block of the active uplink bandwidth part), etc.

FIG. 3B is a block diagram illustrating radio resource control (RRC) states for a UE according to some implementations of the present disclosure. NR introduces an additional operational state to the UE state machine 310, and thus additional state transitions, but the UE still operates in only one state at a time. A RRC connected state 312 (NR RRC_CONNECTED) corresponds to the LTE CONNECTED state for active data transfer, and a RRC idle state 316 (NR RRC_IDLE) corresponds to the LTE IDLE state for initial access. A RRC inactive state 314 (NR RRC_INACTIVE) is a new radio resource control (RRC) state that is similar to the idle state 316, but that maintains access stratum (AS) context information by implementing UE specific discontinuous reception (DRX). The UE specific DRX may be configured by upper layers or by the RRC layer.

Figure 3C:
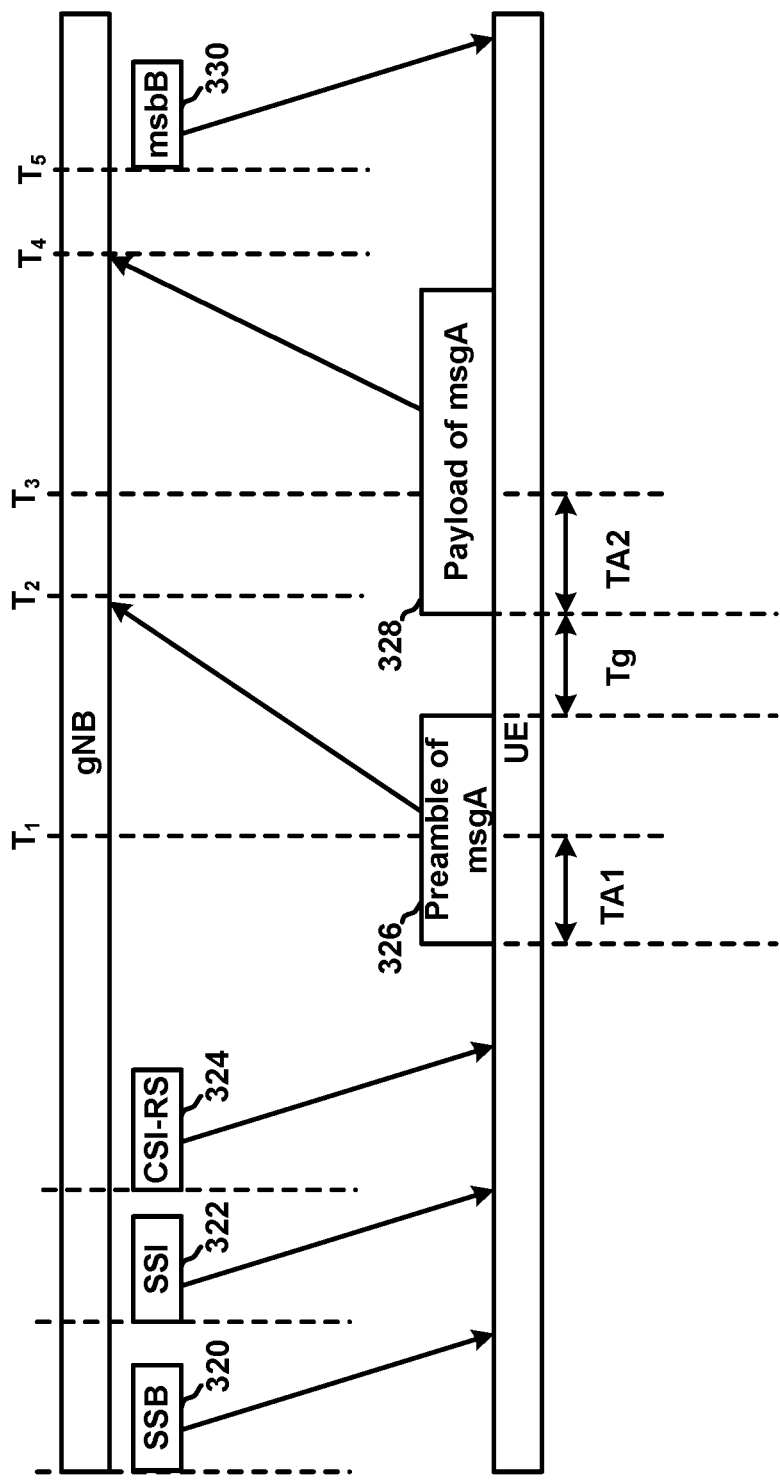
FIG. 3C is a block diagram illustrating open loop timing control for 2-step random access channel (RACH) according to some implementations of the present disclosure.

FIG. 3C is a block diagram illustrating open loop timing control for 2-step random access channel (RACH) according to some implementations of the present disclosure. As shown in FIG. 3C, one or more transmission gap adjustment (TGA) may be implemented according to aspects of the disclosure. For example, TGA may be applied to the msgA preamble, such as by providing a transmission gap between msgA preamble and a downlink (DL) timing reference point. In accordance with some aspects, when the TA timer stops running, the TGA for msgA preamble can be set to "0"; otherwise, the UE can apply the previous TA (such as obtained from a preceding closed loop timing control procedure). Additionally or alternatively, TGA ma be applied to the msgA payload, such as by providing a transmission gap between msgA payload and a DL timing reference point.

Downlink (DL) timing estimation may be performed by a 2-step RACH UE based on one or more reference signals received from a base station. For example, idle and inactive state UEs can monitor synchronization signal block (SSB) transmissions 320 and system information block (SIB) transmissions 322 by the base station. Connected state UEs can monitor these transmissions and additional reference signals such as channel state information reference signal (CSI-RS) transmissions 324. Based on these transmissions, the UE can estimate the DL timing and assume a reference time (for example, $T_1, T_2, T_3, T_4, T_5$). The UE can, thus, determine one or more TGAs, such as a first TGA, TA1, for the msgA preamble 326 and a second TGA, TA2, for the msgA payload 328. The UE may further determine a tuning gap Tg to be inserted between transmission of the preamble and payload of msgA. The base station may receive a msgA from each of one or more UEs and determine timing control information for specific UEs individually, or for groups of the UEs. The base station encodes this timing control information into the msgB 330 payload and transmits the msgB 330 to the specific UE or group of UEs. Each UE, upon receiving and processing the contents of msgB 330, uses the obtained timing control information to improve its synchronization with the base station enabling the UE to exchange wireless communications with the base station with reduced timing error.

There are various options for implementing the open loop timing control for the 2-step RACH UE. In some implementations, the UE can apply the same amount of TGA to both the preamble and the payload of msgA (that is, TA1=TA2). This may be beneficial when the preamble and the payload have a same numerology and power class. A single time offset (for example, TA1) may be implemented with respect to the start of each PRACH slot (for example, counted as the number of slots, based on the numerology of the active uplink bandwidth part) of the preamble, and the symbol level offset may be implied in a SLIV-based indication. As described above, an additional tuning gap Tg can be inserted between the preamble and the payload. The amount of the Tg can be fixed as a constant, or can be down-selected from a finite set of values signaled in system information (SI) (for example, the UE may limit its selection to a subset of pre-defined tables). Further, the amount of TGA can be UE-specific or UE-group specific. In some other implementations, the UE applies different amounts of TGA to the preamble and the payload of msgA (that is, TA1≠TA2). In some such implementations, the determinations of TA1 and TA2 can be UE-specific or UE-group specific. As in the above example, an additional Tg can be inserted between the preamble and the payload. Additionally, the amount of the Tg can be jointly determined with the determinations of TA1 and TA2, be fixed as a constant, or be down-selected from a finite set of values signaled in SI. When applied to unlicensed spectrum, the amount of the Tg can depend on the listen-before-talk mechanism and the slot format.

The base station also may implement a variety of timing control procedures. For example, in addition to SSB, SIB, or a combination thereof, the gNB can transmit an additional RS (for example CSI-RS) to RRC_CONNECTED UEs to provide more opportunities for DL measurements. Also, when the gNB receives and processes msgA from one or multiple 2-step RACH UEs, the gNB can use an enhanced receiver algorithm to detect the residual timing or frequency offsets. Accordingly, the gNB can choose to encode the timing control information in msgB based on the detected timing or frequency offsets. Further, the gNB may detect the UE ID and time/frequency/space RACH occasions (ROs) of one or multiple 2-step RACH UEs, and send msgB to each successfully detected UE in a respective resource unit indexed by l. The determination of l can be made as a function of the RO index x (for example, l=f(x)). The mapping function f(x) can be pre-configured and may be RRC-state dependent. Alternatively or additionally, the mapping function can be signaled by SI or pre-defined in a wireless communication standard. Examples of the mapping function include the use of a hash table, linear or piece-wise linear functions, or nonlinear polynomial functions. Finally, the payload of msgB can include additional timing control information for 2-step RACH UEs, as discussed above.

Another option for achieving timing control for 2-step RACH UEs is to implement RRC-state dependent timing control. In this aspect, different RRC states are potentially associated with different UL synchronization statuses. To enhance the performance of msgA transmissions and reduce the signaling overhead, it may be beneficial to design open loop timing control procedures in accordance to the RRC state. In accordance with aspects of the disclosure, the TGA configuration for one or more of the msgA preamble and the msgA payload may be selected for a UE in a specific RRC state by DL reference signal (RS) measurement, configuration information in one or more of the SI and RRC, or a combination thereof.

For 2-step RACH in the RRC_CONNECTED state when the TA timer is not running, or in the RRC_INACTIVE or RRC_IDLE states, the UE cannot assume UL synchronization for msgA transmission. In some implementations, the gNB broadcasts possible configurations of the TGA in SIB, including at least the granularity and range of the TGA. Here, the granularity of the TGA can depend on the subcarrier spacing (SCS) of the PUSCH in msgA, and the range of the TGA can depend on the RRC state, cell coverage, or a combination thereof. In some other implementations, the possible configurations of the TGA for 2-step RACH are specified by multiple look-up tables (LUTs) in a wireless communications standard. In some such implementations, the gNB broadcasts a table index of the LUT in the SIB or the RRC signal. For example, the entries of such LUTs can be designed as rounded values of the propagation delay and multipath delay spread for a specific cell coverage target.

The table below illustrates an example in which the granularity of the TA depends on the SCS of the PUSCH in msgA. In the example below, the TA command in msgB is a 12-bit command and the granularity of the TA command is determined based on the particular subcarrier spacing of the PUSCH, as shown. In this example, the TA command in msgB is obtained from receiving the msgA preamble, and is part of the closed loop timing control information.

| Subcarrier Spacing (kHz) of the PUSCH | Unit (Tc = 1/(480 * 4096) second) |
| --- | --- |
| 15 | 16 * 64 Tc |
| 30 | 8 * 64 Tc |
| 60 | 4 * 64 Tc |
| 120 | 2 * 64 Tc |

In contrast to the TA command in msgB described above, the TGA provided according to aspects of the disclosure is configurable and is applied to msgA in open loop timing control. The TGA may, for example, include a slot-level offset (X) and a symbol-level offset (Y). In accordance with aspects of the disclosure, the values of the slot-level offset (X) and symbol-level offset (Y) may be configured by the network, such as may be received by the UE in system information or RRC signaling before msgA transmission. For example, the slot-level offset (X) may be an integer in the range of [0, 1, . . . , 32] and the symbol-level offset (Y) may be an integer in the range of [0, 1, . . . , 13], where the values of X and Y can be different for different RRC states. In an example implementation in which the granularity of the TGA depends on the SCS of the PUSCH in msgA, the granularity of the slot-level offset (X) and the symbol-level offset (Y) depends on the SCS of the PUSCH in msgA.

Alternatively, for 2-step RACH in the RRC_CONNECTED state when the TA timer is running, the UE may assume UL synchronization and use the previous TA value (TA0) as a reference for 2-step RACH. When a Tg is implemented between the preamble and the payload of msgA, new TGA values for TA1 and TA2 can be determined based on TA0. For example, the values of TA1 and TA2 can be determined as an incremental step size or decremental step size applied to TA0, that is: TA1=TA0+delta1 and TA2=TA0+delta2. When the Tg is 0, the UE can reuse TA0 for both TA1 and TA2.

Further options are available for refining the timing control for 2-step RACH. For example, configurable values of the TGA, TA1 or TA2 for msgA can depend on carrier frequency range. For example, due to differences in channel propagation in frequency range 1 (FR1), which defines frequencies below 6 GHz; and frequency range 2 (FR2), which defines millimeter wave frequencies at 24 GHz or above, different granularities or ranges of TGA, TA1 or TA2 values may be considered. Additionally, the determination of TGA, TA1 or TA2 can depend on the duplexing mode, because time division duplex (TDD) has more strict timing control accuracy attributes than frequency division duplex (FDD), which has more tolerance to timing control inaccuracies. Also, the determination of TGA, TA1 or TA2 can depend on DL measurements of the RS receive power (RSRP), the signal to noise ratio (SNR) of SSB, SIB, one or more additional RSs, or any combination thereof to improve the determination. The base station can transmit CSI-RS, positioning RS (PRS), or another RS (for example tracking RS (TRS)) to connected mode UEs, and the base station may transmit a new type of RS that can be received by idle and inactive UEs for the purpose of RSRP/SNR measurements that improve tracking.

Figure 4B:
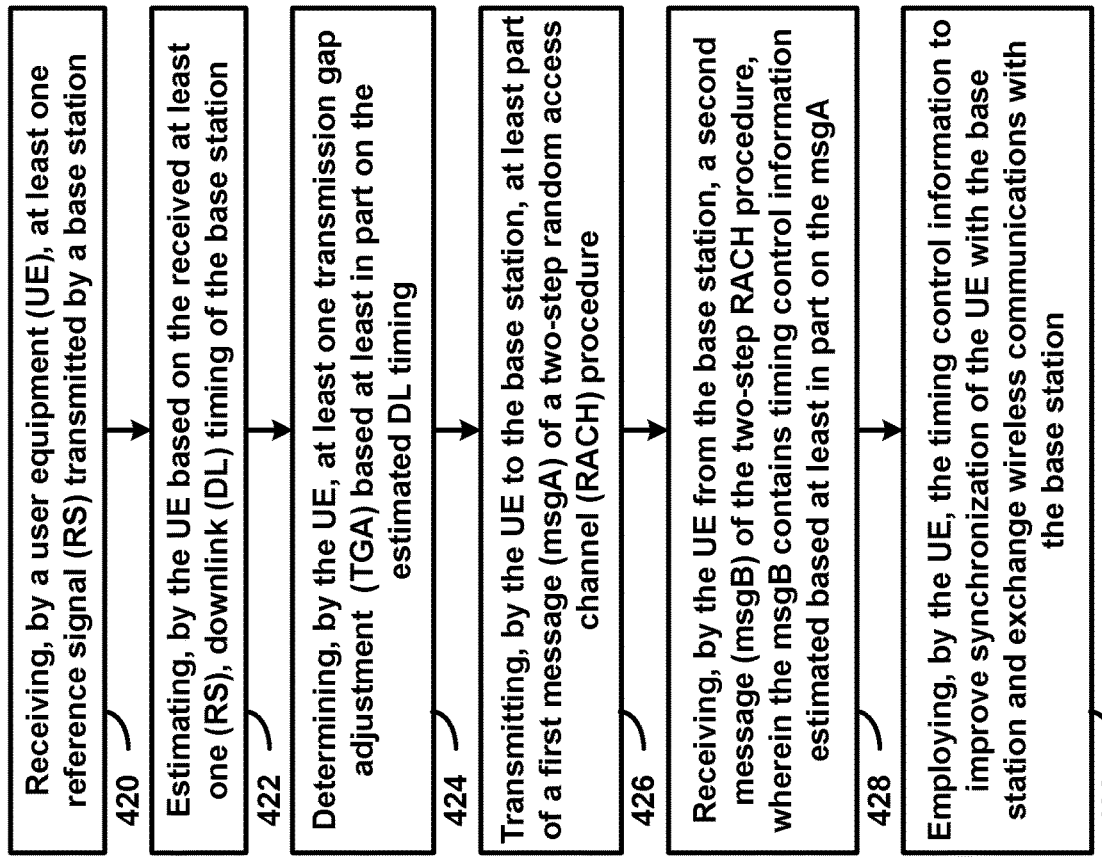
FIG. 4B is a block diagram illustrating example blocks of a wireless communication process carried out by a UE operating in accordance with open loop timing control according to some implementations of the present disclosure.
Figure 4A:
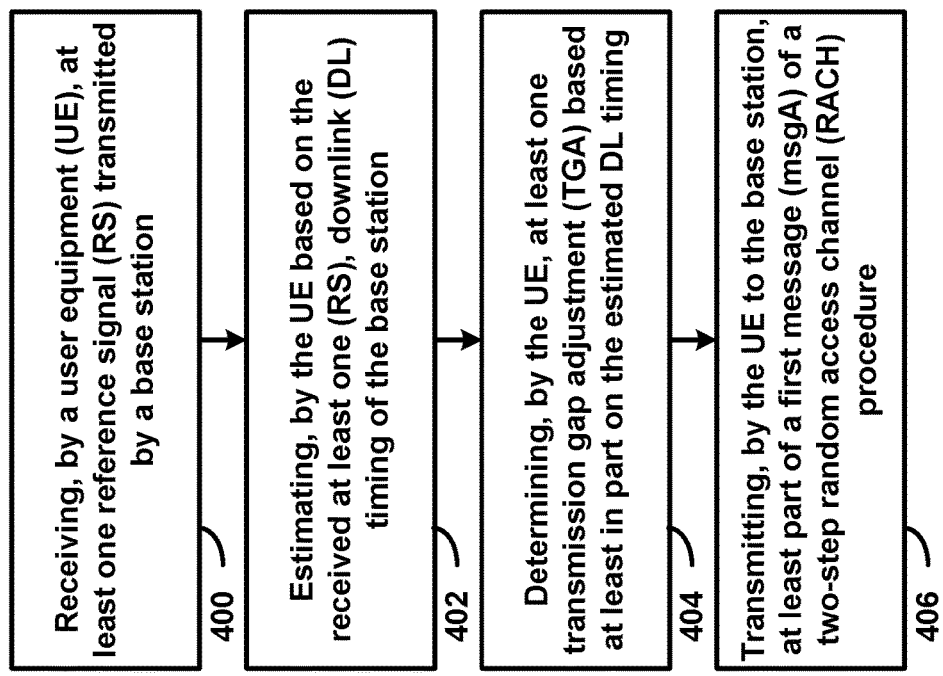
FIG. 4A is a block diagram illustrating example blocks of a wireless communication process carried out by a UE operating in accordance with open loop timing control according to some implementations of the present disclosure.

FIG. 4A is a block diagram illustrating example blocks of a wireless communication process carried out by a UE operating in accordance with open loop timing control according to some implementations of the present disclosure. The method begins at block 400 by receiving, by the UE, at least one reference signal (RS) transmitted by a base station. The at least one RS includes at least one of synchronization signal blocks (SSBs), system information blocks (SIBs), or another reference signal, such as a channel state information reference signal (CSI-RS). Processing may proceed from block 400 to block 402.

At block 402, the method continues by estimating, by the UE, downlink (DL) timing of the base station based on the received at least one RS. Estimating the DL timing at block 402 may also include measuring, by the UE, reference signal receive power (RSRP), signal to noise ratio (SNR) of the at least one reference signal, or a combination thereof. Processing may proceed from block 402 to block 404.

At block 404, the method continues by determining, by the UE, at least one transmission gap adjustment (TGA) based at least in part on the estimated DL timing. For example, the UE may determine a first TGA (TA1) and a second TGA (TA2), where TA1=TA2 or TA1≠TA2. Additionally, the UE may determine the at least one TGA by determining an amount of a tuning gap (Tg) between the preamble and the payload and jointly considering the amount of the Tg with values of TA1 and TA2. An amount of the Tg may be fixed as a constant in a wireless communication standard or determined by the UE down selecting the amount from a finite set of values indicated by system information (SI). Also, the amount of the at least one TGA may be UE-specific or UE-group specific. Further, the UE may determine at least one of a granularity or range of the at least one TGA based at least in part on a carrier frequency range in which the UE exchanges wireless communications with the base station, a duplexing mode for transmission of the msgA, or a combination thereof. Further, the UE may determine the at least one TGA based at least in part on the measurement of RSRP, SNR, or a combination thereof. Processing may proceed from block 404 to block 406.

At block 406, the method continues by transmitting, by the UE to the base station, at least part of a first message (msgA) of a two-step random access channel (RACH) procedure. The transmission of the msgA includes applying, by the UE, the at least one TGA to transmission of at least one of a preamble or payload of the msgA. For example, the UE may apply the TA1 to the preamble and applies the TA2 to the payload. Additionally, the UE may apply a tuning gap (Tg) between the preamble and the payload. After block 406, processing may end. Alternatively, processing may return from block 406 to an earlier point in the process, such as block 400.

FIG. 4B is a block diagram illustrating example blocks of a wireless communication process carried out by a UE operating in accordance with open loop timing control according to some implementations of the present disclosure. The method includes blocks 420, 422, 424, and 426, which respectively correspond to blocks 400, 402, 404, and 406 as described above with reference to FIG. 4A. However, processing may proceed from block 426 to block 428.

At block 428, the method continues by receiving, by the UE from the base station, a second message (msgB) of the two-step RACH procedure. The msgB contains timing control information based at least in part on the msgA. Processing proceeds from block 428 to block 430.

At block 430, the method continues by using, by the UE, the timing control information to improve synchronization of the UE with the base station and exchange wireless communications with the base station. After block 430, processing may end. Alternatively, processing may return from block 430 to an earlier point in the process, such as block 420.

FIG. 5A is a block diagram illustrating example blocks of a wireless communication process carried out by a base station operating in accordance with open loop timing control according to some implementations of the present disclosure. The method begins at block 500 by transmitting, by the base station, at least one reference signal (RS). The at least one RS includes at least one of synchronization signal blocks (SSBs), system information blocks (SIBs), or another reference signal, such as a channel state information reference signal (CSI-RS). The other reference signal may be detectable at least by radio resource control (RRC) connected state (RRC_CONNECTED) UEs. Processing may proceed from block 500 to block 502.

At block 502, the method continues by receiving, by the base station from at least one user equipment (UE), at least one first message (msgA) of a two-step random access channel (RACH) procedure. The msgA includes a preamble and a payload. The at least one msgA indicating an application, by the at least one UE, of at least one transmission gap adjustment (TGA) to transmission of at least one of the preamble or the payload of the at least one msgA. The TGA is determined from an estimate of downlink (DL) timing of the base station that is based on the at least one RS. Processing may proceed from block 502 to block 504.

At block 504, the method continues by transmitting, by the base station to the UE, a second message (msgB) of the two-step RACH procedure. After block 504, processing may end. Alternatively, processing may return from block 504 to an earlier point in the process, such as block 500.

FIG. 5B is a block diagram illustrating example blocks of a wireless communication process carried out by a base station operating in accordance with open loop timing control according to some implementations of the present disclosure. The method includes blocks 520, 522, and 528, which respectively correspond to blocks 500, 502, and 504 as described above with reference to FIG. 5A. However, processing may proceed from block 522 to block 524.

At block 524, the method continues by generating, by the base station, timing control information based at least in part on the msgA. For example, the base station may detect a residual at least one of timing or frequency (timing/frequency) offset based on the msgA. Here, the msgB transmitted at block 528 contains the timing control information. Processing may proceed from block 524 to block 526.

At block 526, the method continues by encoding, by the base station, the timing control information in the msgB, for example, based on the detected residual timing/frequency offset. Processing may proceed form block 526 to block 528, at which the msgB contains the timing control information encoded therein. After block 528, processing may end. Alternatively, processing may return from block 528 to an earlier point in the process, such as block 520.

Figure 5C:
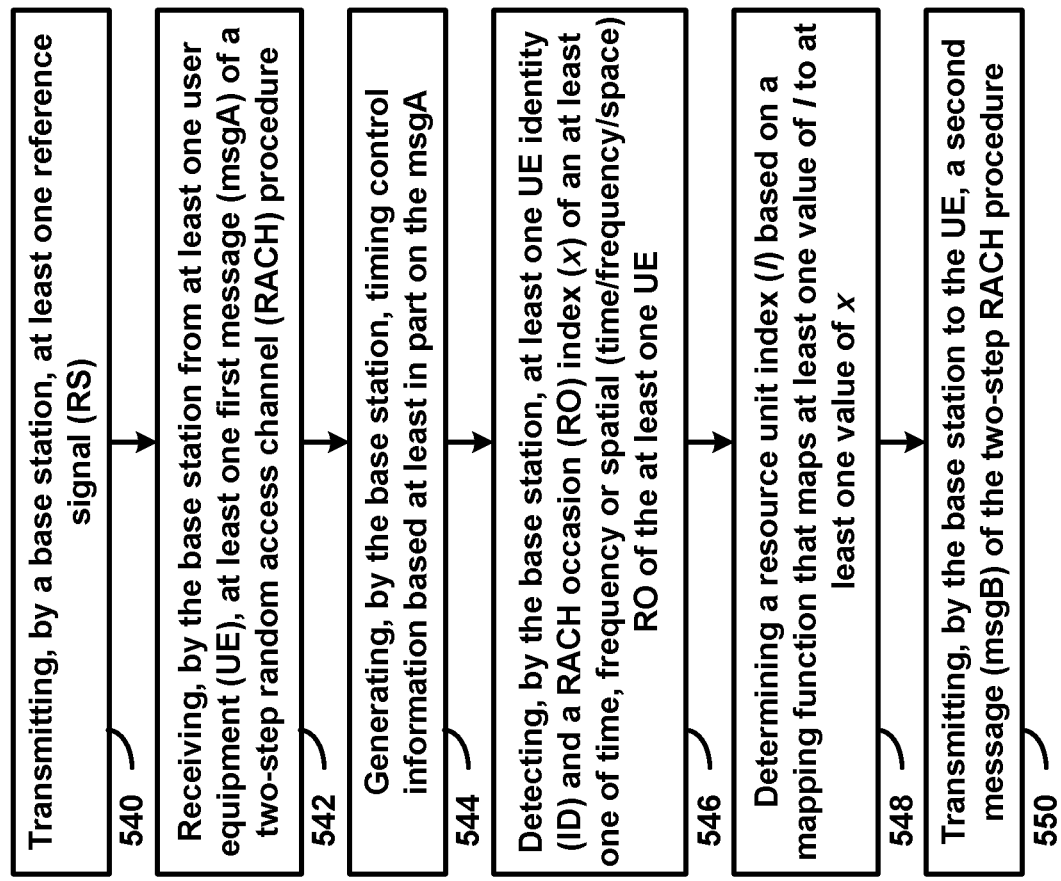
FIG. 5C is a block diagram illustrating example blocks of a wireless communication process carried out by a base station operating in accordance with open loop timing control according to some implementations of the present disclosure.

FIG. 5C is a block diagram illustrating example blocks of a wireless communication process carried out by a base station operating in accordance with open loop timing control according to some implementations of the present disclosure. The method includes blocks 540, 542, and 550, which respectively correspond to blocks 500, 502, and 504 as described above with reference to FIG. 5A. However, processing may proceed from block 542 to block 544.

At block 544, the method continues by generating, by the base station, timing control information based at least in part on the msgA. For example, the base station may detect a residual at least one of timing or frequency (timing/frequency) offset based on the msgA. Here, the msgB transmitted at block 550 contains the timing control information. Processing may proceed from block 544 to block 546.

At block 546, the method continues by detecting, by the base station, at least one UE identity (ID) and a RACH occasion (RO) index (x) of an at least one of time, frequency or spatial (time/frequency/space) RO of the at least one UE. Processing may proceed form block 546 to block 548.

At block 548 the method continues by determining a resource unit index (l) based on a mapping function that maps at least one value of l to at least one value of x, and the base station transmits the msgB in a resource unit indexed by l. The mapping function may pre-configured and radio resource control (RRC)-state dependent, signaled by system information (SI) or radio resource control (RRC) signaling, or predetermined in in a wireless communication standard. Processing may proceed form block 548 to block 550.

The msgB transmitted at block 550 contains the timing control information, and the base station transmits the msgB in a resource unit indexed by l. It should be understood that the timing control information may be encoded in the msgB based on detected residual timing/frequency offset, as described above. After block 550, processing may end. Alternatively, processing may return from block 550 to an earlier point in the process, such as block 540.

Figure 6A:
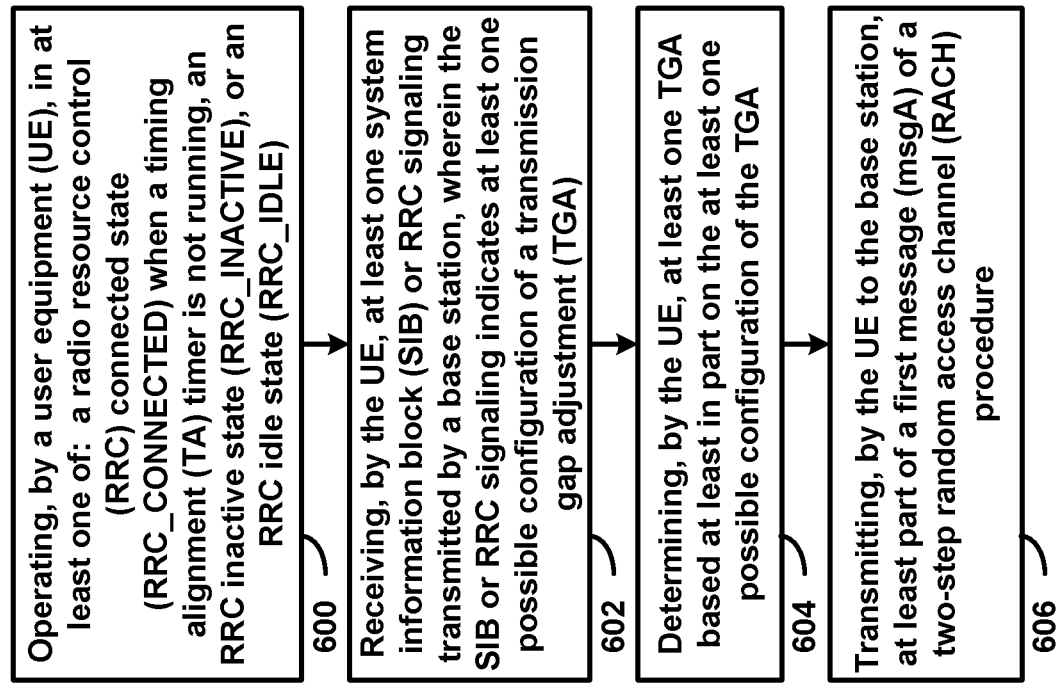
FIG. 6A is a block diagram illustrating example blocks of a wireless communication process carried out by a UE operating in accordance with open loop timing control according to some implementations of the present disclosure.

FIG. 6A is a block diagram illustrating example blocks of a wireless communication process carried out by a UE operating in accordance with open loop timing control according to some implementations of the present disclosure. The method begins at block 600 by operating, by the UE, in at least one of: a radio resource control (RRC) connected state (RRC_CONNECTED) when a timing alignment (TA) timer is not running, an RRC inactive state (RRC_INACTIVE), or an RRC idle state (RRC_IDLE). Processing may proceed from block 600 to block 602.

At block 602, the method continues by receiving, by the UE, at least one system information block (SIB) or RRC signaling transmitted by a base station. The SIB or RRC signaling indicates at least one possible configuration of a transmission gap adjustment (TGA). For example, the SIB or RRC signaling may indicate the at least one possible configuration of the TGA at least in part by explicitly providing at least one granularity and at least one range of the TGA. Alternatively, the SIB or RRC signaling may indicate the at least one possible configuration of the TGA at least in part by providing an index mapped to at least one granularity and at least one range of the TGA. At least one mapping of the index to the at least one granularity and at least one range of the TGA may be pre-defined, for example, in a wireless communication standard. Processing may proceed from block 602 to block 604.

At block 604, the method continues by determining, by the UE, at least one TGA based at least in part on the at least one possible configuration of the TGA. For example, a granularity of the TGA may depend at least on a subcarrier spacing of a physical uplink shared channel (PUSCH) of the msgA. Additionally, a range of the TGA may depend on an RRC state of the UE, cell coverage characteristics, or a combination thereof. Also, the UE may determine at least one of a granularity or range of the at least one TGA based at least in part on a carrier frequency range in which the UE exchanges wireless communications with the base station. Further, the UE may determine the at least one TGA based at least in part on a duplexing mode for transmission of the msgA. Processing may proceed from block 604 to block 606.

At block 606, the method continues by transmitting, by the UE to the base station, at least part of a first message (msgA) of a two-step random access channel (RACH) procedure. The transmission of the msgA includes applying, by the UE, the at least one TGA to transmission of at least one of a preamble or payload of the msgA. After block 606, processing may end. Alternatively, processing may return from block 606 to an earlier point in the process, such as block 600.

FIG. 6B is a block diagram illustrating example blocks of a wireless communication process carried out by a UE operating in accordance with open loop timing control according to some implementations of the present disclosure. The method includes blocks 620, 622, 626, and 628, which respectively correspond to blocks 600, 602, 604, and 606 as described above with reference to FIG. 6A. However, processing may proceed from block 622 to block 624.

At block 624, the method continues by measuring, by the UE, reference signal receive power (RSRP) or signal to noise ratio (SNR) of the at least one of a synchronization signal block (SSB), the SIB, or another reference signal (RS), such as a channel state information reference signal (CSI-RS). Processing may proceed from block 624 to block 626, at which the UE may determine the at least one TGA based at least in part on the measurement of at least one of RSRP or SNR.

FIG. 7A is a block diagram illustrating example blocks of a wireless communication process carried out by a UE operating in accordance with open loop timing control according to some implementations of the present disclosure. The method begins at block 700 by operating, by the UE, in a radio resource control (RRC) connected state (RRC_CONNECTED) when a timing alignment (TA) timer is running. Processing may proceed from block 700 to block 702.

At block 702, the method proceeds by determining, by the UE, at least one TGA based at least in part on a previous TA value (TA0). The UE may determine the at least one TGA in part by determining whether a tuning gap (Tg) is needed between the preamble and payload of msgA. Alternatively or additionally, the UE may determine that a first TGA (TA1) applicable to the preamble and a second TGA (TA2) applicable to the payload are both equal to TA0 in response to determining that the Tg is not needed. Also, the UE may determine at least one of a granularity or range of the at least one TGA based at least in part on a carrier frequency range in which the UE exchanges wireless communications with the base station, a duplexing mode for transmission of the msgA, or a combination thereof. Processing may proceed from block 702 to block 704.

At block 704, the method proceeds by transmitting, by the UE to the base station, at least part of a first message (msgA) of a two-step random access channel (RACH) procedure. Here, the transmission of the msgA includes applying, by the UE, the at least one TGA to transmission of at least one of a preamble or payload of the msgA. Additionally, in response to determining that the Tg is needed at block 702, the transmission of the msgA at block 704 may include applying, by the UE, the Tg between the preamble and the payload. After block 704, processing may end. Alternatively, processing may return from block 704 to an earlier point in the process, such as block 700.

FIG. 7B is a block diagram illustrating example blocks of a wireless communication process carried out by a UE operating in accordance with open loop timing control according to some implementations of the present disclosure. The method includes blocks 720, 724, and 726, which respectively correspond to blocks 700, 702, and 704 as described above with reference to FIG. 7A. However, processing may proceed from block 720 to block 722.

At block 722, the method continues by measuring, by the UE, reference signal receive power (RSRP) or signal to noise ratio (SNR) of the at least one reference signal (RS) transmitted by the base station. The RS may be at least one of a synchronization signal block (SSB), system information block (SIB), or another RS, such as a channel state information reference signal (CSI-RS). Processing may proceed from block 722 to block 724, at which the UE may determine the at least one TGA based at least in part on the measurement of at least one of RSRP or SNR.

FIG. 8A is a block diagram illustrating example blocks of a wireless communication process carried out by a base station operating in accordance with open loop timing control according to some implementations of the present disclosure. The method begins at block 800 by transmitting, by the base station at least one system information block (SIB) that indicates at least one possible configuration of a transmission gap adjustment (TGA) at block 800. For example, the SIB or RRC signaling may indicate the at least one possible configuration of the TGA at least in part by explicitly providing at least one granularity and at least one range of the TGA. Alternatively, the SIB or RRC signaling may indicate the at least one possible configuration of the TGA at least in part by providing an index mapped to at least one granularity and at least one range of the TGA. At least one mapping of the index to the at least one granularity and at least one range of the TGA may be pre-defined, for example, in a wireless communication standard. A granularity of the TGA may depend on a subcarrier spacing of a physical uplink shared channel (PUSCH) of the msgA. A range of the TGA may depend on a radio resource connected (RRC) state of the UE, on cell coverage characteristics, or a combination thereof. Processing may proceed from block 800 to block 802.

At block 802, the method continues by receiving, by the base station from a user equipment (UE), at least part of a first message (msgA) of a two-step random access channel (RACH) procedure. The transmission of the msgA indicates application of at least one TGA to transmission of at least one of a preamble or payload of the msgA. Also, the at least one TGA is determined based on the at least one possible configuration of the TGA. After block 802, processing may end. Alternatively, processing may return from block 802 to an earlier point in the process, such as block 800.

Figures 8B, 8C:
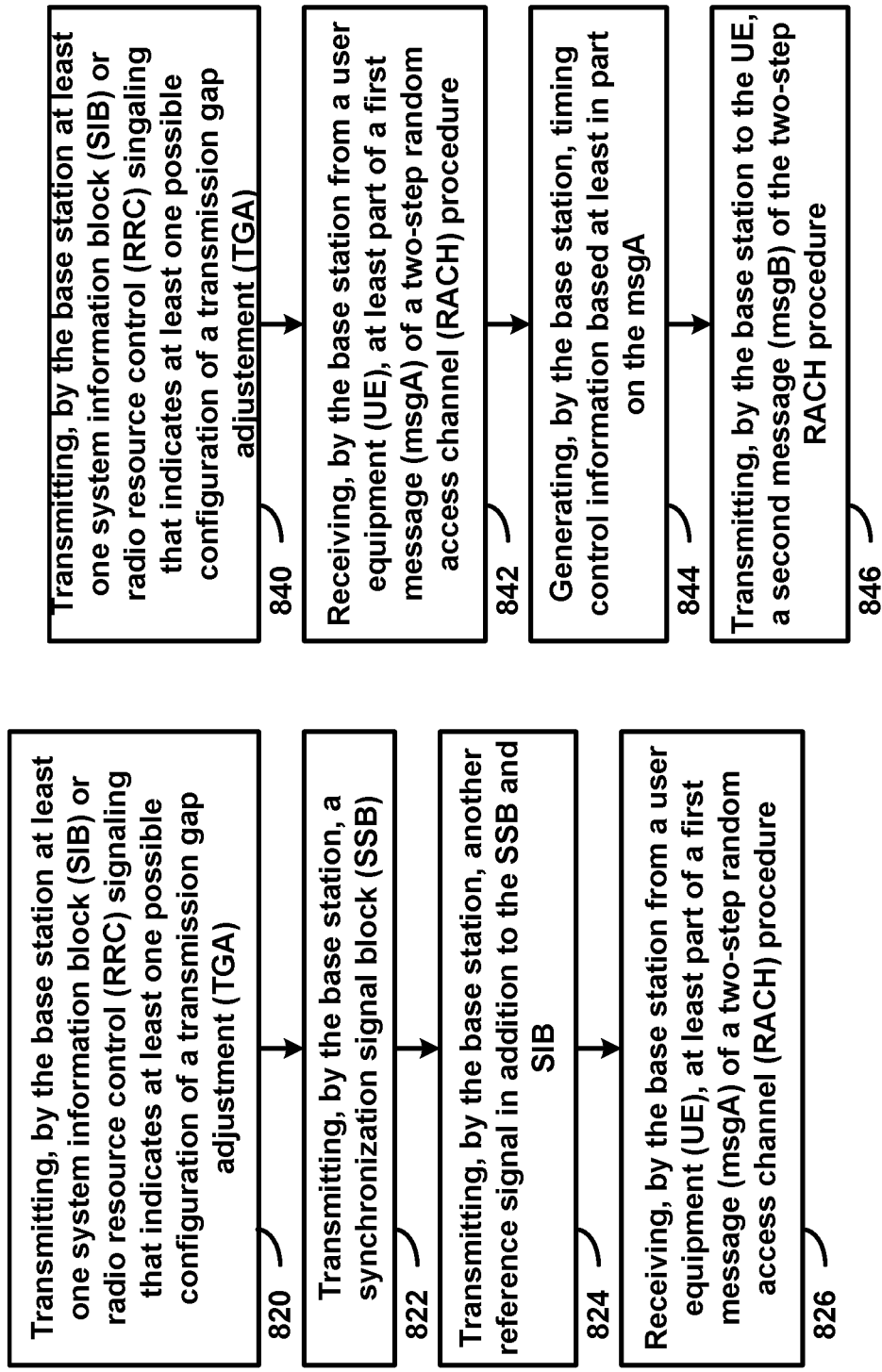
FIG. 8B is a block diagram illustrating example blocks of a wireless communication process according to some implementations of the present disclosure.
FIG. 8C is a block diagram illustrating example blocks of a wireless communication process carried out by a base station operating in accordance with open loop timing control according to some implementations of the present disclosure.

FIG. 8B is a block diagram illustrating example blocks of a wireless communication process according to some implementations of the present disclosure. The method includes blocks 820 and 826, which respectively correspond to blocks 800 and 802 as described above with reference to FIG. 8A. However, processing may proceed from block 820 to block 822.

At block 822, the method continues by transmitting, by the base station, a synchronization signal block (SSB). Processing may proceed from block 822 to block 824.

At block 824, the method continues by transmitting, by the base station, another reference signal in addition to the SSB and SIB. The other reference signal aids the UE in measuring RSRP, SNR, or a combination thereof, thus improving accuracy of determination of the at least one TGA based at least in part on the measurement of RSRP or SNR. Processing may proceed from block 824 to block 826.

FIG. 8C is a block diagram illustrating example blocks of a wireless communication process carried out by a base station operating in accordance with open loop timing control according to some implementations of the present disclosure. The method includes blocks 840 and 842, which respectively correspond to blocks 800 and 802 as described above with reference to FIG. 8A. However, processing may proceed from block 842 to block 844.

At block 844, the method continues by generating, by the base station, timing control information based at least in part on the msgA. For example, the base station may detect a residual at least one of timing or frequency (timing/frequency) offset based on the msgA. Processing may proceed from block 844 to block 846.

In block 846, the method continues by transmitting, by the base station to the UE, a second message (msgB) of the two-step RACH procedure. The msgB contains the timing control information generated in block 844. It should be understood that the methods of FIG. 8C may additionally include procedures that those described above with reference to block 526 (see FIG. 5B), blocks 546 and 548 (see FIG. 5C), and blocks 822 and 824 (see FIG. 8B). Accordingly, the msgB transmitted at block 846 may contain timing control information that is encoded based on residual timing/frequency offset, be transmitted in a resource unit indexed by 1, or a combination thereof. After block 846, processing may end. Alternatively, processing may return from block 846 to an earlier point in the process, such as block 840.

FIG. 9 is a block diagram illustrating example components of a user equipment (UE) carried out by a base station operating in accordance with open loop timing control according to some implementations of the present disclosure. A UE 900, such as a UE 115 (see FIG. 2), may have a controller/processor 280, a memory 282, and antennas 252*a* through 252*r*, as described above. UE 900 may also have wireless radios 901a to 901r that include additional components also described above with reference to FIG. 2. The memory 282 of UE 900 stores one or more algorithms that configure processor/controller 280 to carry out one or more procedures as described above with reference to FIGS. 3A, 3B, 4A, and 4B.

One or more algorithms stored by memory 282 configure processor/controller 280 to carry out one or more procedures relating to wireless communication by the UE 900, as previously described. For example, reference signal receiver 902 configures controller processor 280 to carry out operations that include receiving one or more reference signals in any manner previously described, such as with reference to blocks 400 (see FIG. 4A) and 420 (see FIG. 4B). Additionally, downlink timing estimator 903 configures controller processor 280 to carry out operations that include estimating downlink timing in any manner previously described, such as with reference to blocks 402 (see FIG. 4A) and 422 (see FIG. 4B). Also, transmission gap adjustment determiner 904 configures controller/processor 280 to carry out operations that include determining a transmission gap adjustment in any manner previously described, such as with reference to blocks 404 (see FIG. 4A) and 424 (see FIG. 4B). Further, msgA transmitter 905 configures controller/processor 280 to carry out operations that include transmitting all or part of msgA in any manner previously described, such as with reference to blocks 406 (see FIG. 4A) and 426 (see FIG. 4B). Further, msgB receiver 906 configures controller/processor 280 to carry out operations that include receiving and processing msgB in any manner previously described, such as with reference to block 428 (see FIG. 4B). Further, synchronization improver 907 configures controller/processor 280 to carry out operations that include improving synchronization in any manner previously described, such as with reference to block 430 (see FIG. 4B).

FIG. 10 is a block diagram illustrating example components of a base station according to some implementations of the present disclosure. A base station 1000, such as a NR-SS base station 105 (see FIG. 2), may have a controller/processor 240, a memory 242, and antennas 234a through 234t, as described above. The base station 1000 may also have wireless radios 1001a to 1001t that include additional components also described above with reference to FIG. 2. The memory 242 of base station 1000 stores one or more algorithms that configure processor/controller 240 to carry out one or more procedures as described above with reference to FIGS. 3 and 5A, 5B, and 5C.

One or more algorithms stored by memory 242 configure processor/controller 240 to carry out one or more operations relating to wireless communication by the base station 1000, as previously described. For example, reference signal transmitter 1002 configures controller processor 240 to carry out operations that include transmitting one or more reference signals in any manner previously described, such as with reference to blocks 500 (see FIG. 5A), 520 (see FIG. 5B), and 540 (see FIG. 5C). Additionally, msgA receiver 1003 configures controller processor 240 to carry out operations that include receiving one or more msgA form one or more UE in any manner previously described, such as with reference to blocks 502 (see FIG. 5A), 522 (see FIG. 5B), and 542 (see FIG. 5C). Also, timing control information generator 1004 configures controller processor 240 to carry out operations that include generating timing control information in any manner previously described, such as with reference to blocks 524 (see FIG. 5B) and 544 (see FIG. 5C). Further, timing control information encoder 1005 configures controller processor 240 to carry out operations that include encoding timing control information in any manner previously described, such as with reference to block 526 (see FIG. 5B). Further, UE identity and RACH occasion index detector 1006 configures controller processor 240 to carry out operations that include detecting a UE identity and RACH occasion index in any manner previously described, such as with reference to block 546 (see FIG. 5C). Further, resource unit index determiner 1007 configures controller processor 240 to carry out operations that include determining a resource unit index in any manner previously described, such as with reference to block 548 (see FIG. 5C). Further, msgB transmitter 1009 configures controller processor 240 to carry out operations that include transmitting msgB in any manner previously described, such as with reference to blocks 504 (see FIG. 5A), 528 (see FIG. 5B), and 550 (see FIG. 5C).

Figures 11, 12:
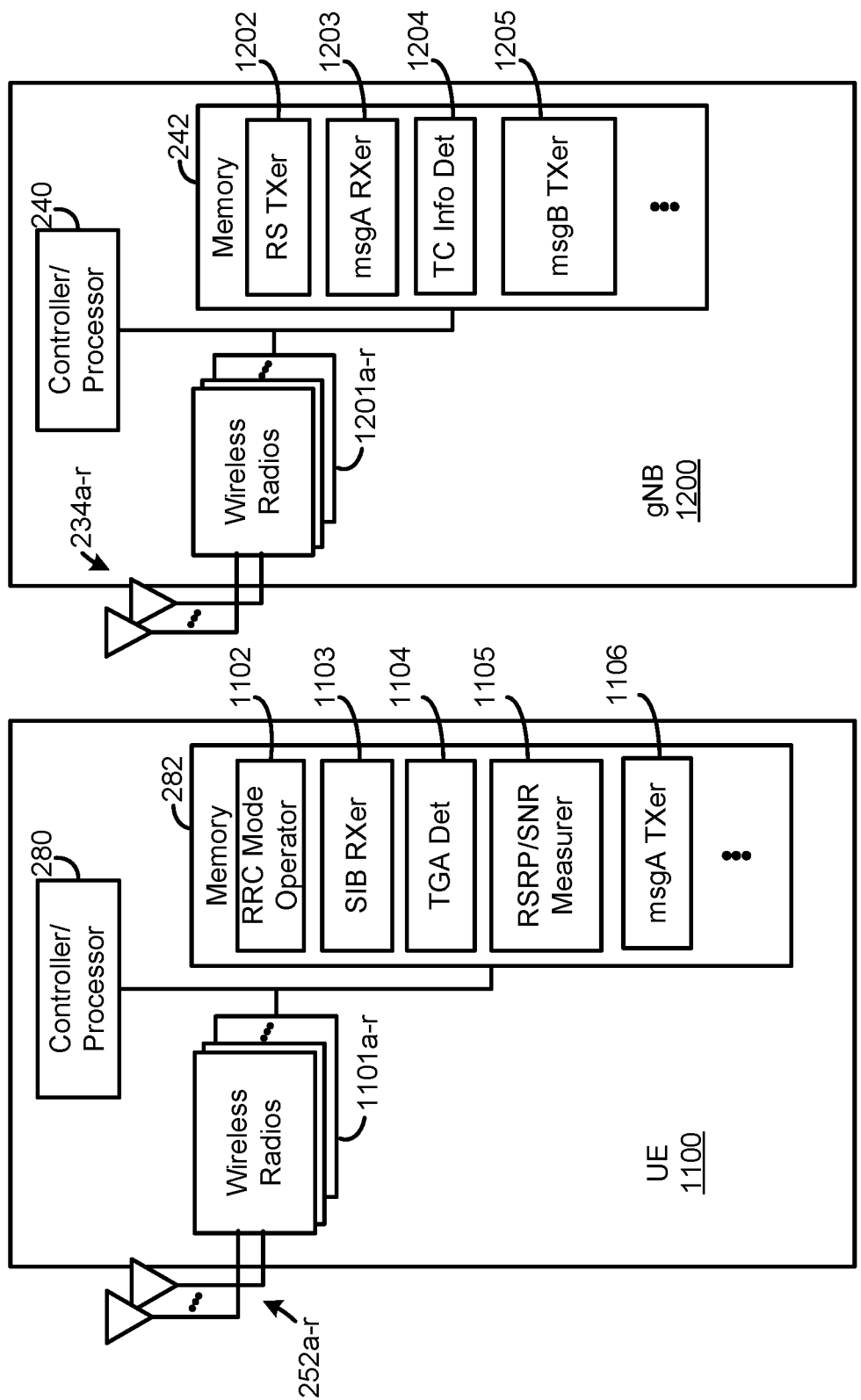
FIG. 11 is a block diagram illustrating example components of a user equipment (UE) according to some implementations of the present disclosure.
FIG. 12 is a block diagram illustrating example components of a base station according to some implementations of the present disclosure.

FIG. 11 is a block diagram illustrating example components of a user equipment (UE) according to some implementations of the present disclosure. A UE 1100, such as a UE 115 (see FIG. 2), may have a controller/processor 280, a memory 282, and antennas 252a through 252r, as described above. UE 1100 may also have wireless radios 1101a to 1101r that include additional components also described above with reference to FIG. 2. The memory 282 of UE 1100 stores one or more algorithms that configure processor/controller 280 to carry out one or more procedures as described above with reference to FIGS. 6A, 6B, 7A, and 7B.

One or more algorithms stored by memory 282 configure processor/controller 280 to carry out one or more procedures relating to wireless communication by the UE 1100, as previously described. For example, RRC mode operator 1102 configures controller processor 280 to carry out operations that include operating in an RRC mode in any manner previously described, such as with reference to blocks 600 (see FIG. 6A), 620 (see FIG. 6B), 700 (see FIG. 7A), and 720 (see FIG. 7B). Additionally, SIB receiver 1103 configures controller processor 280 to carry out operations that include receiving a SIB in any manner previously described, such as with reference to blocks 600 (see FIG. 6A), 620 (see FIG. 6B), 700 (see FIG. 7A), and 720 (see FIG. 7B). Additionally, SIB receiver 1103 configures controller processor 280 to carry out operations that include receiving a SIB in any manner previously described, such as with reference to blocks 602 (see FIG. 6A) and 622 (see FIG. 6B). Also, transmission gap adjustment determiner 1104 configures controller/processor 280 to carry out operations that include determining a transmission gap adjustment in any manner previously described, such as with reference to blocks 604 (see FIG. 6A), 626 (see FIG. 6B), 702 (see FIG. 7A), and 724 (see FIG. 7B). Further, RSRP and SNR measurer 1105 configures controller/processor 280 to carry out operations that include measuring RSRP and SNR in any manner previously described, such as with reference to blocks 624 (see FIG. 6B) and 722 (see FIG. 7B). Further, msgA transmitter 1106 configures controller/processor 280 to carry out operations that include transmitting all or part of a msgA in any manner previously described, such as with reference to blocks 606 (see FIG. 6A), 628 (see FIG. 6B), 704 (see FIG. 7A), and 726 (see FIG. 7B). It should be understood that memory 282 may also store one or more algorithms like msgB receiver 906 and synchronization improver 907 as described above with reference to FIG. 9.

FIG. 12 is a block diagram illustrating example components of a base station according to some implementations of the present disclosure. A base station 1200, such as a NR-SS base station 105 (see FIG. 2), may have a controller/ processor 240, a memory 242, and antennas 234*a* through 234*t*, as described above. The base station 1200 may also have wireless radios 1201*a* to 1201*t* that include additional components also described above with reference to FIG. 2. The memory 242 of base station 1200 stores one or more algorithms that configure processor/controller 240 to carry out one or more procedures as described above with reference to FIGS. 8A, 8B, and 8C.

One or more algorithms stored by memory 242 configure processor/controller 240 to carry out one or more operations relating to wireless communication by the base station 1200, as previously described. For example, reference signal transmitter 1202 configures controller processor 240 to carry out operations that include transmitting one or more reference signals in any manner previously described, such as with reference to blocks 800 (see FIG. 8A), 820, 822, and 824 (see FIG. 8B), and 840 (see FIG. 8C). Additionally, msgA receiver 1203 configures controller processor 240 to carry out operations that include receiving msgA in any manner previously described, such as with reference to blocks 802 (see FIG. 8A), 826 (see FIG. 8B), and 842 (see FIG. 8C). Also, timing control information determiner 1204 configures controller processor 240 to carry out operations that include determining timing control information in any manner previously described, such as with reference to block 844 (see FIG. 8C). Further, msgB transmitter 1205 configures controller processor 240 to carry out operations that include transmitting msgB in any manner previously described, such as with reference to block 846 (see FIG. 8C).

A person having ordinary skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (for example, the functional blocks and modules in FIGS. 2 and 4A, 4B, 5A, 5B, 5C, 6A, 6B, 7A, 7B, 8A, 8B, 8C, 9, 10, 11, and 12) may include processors, electronics devices, hardware devices, electronics components, logical circuits, memories, software codes, firmware codes, etc., or any combination thereof.

A person having ordinary skill in the art will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. A person having ordinary skill in the art may implement the described functionality in varying ways for each particular application, but such implementation decisions are not to be interpreted as causing a departure from the scope of the present disclosure. A person having ordinary skill in the art will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above are also be included within the scope of computer-readable media.

As used herein, including in the claims, the term "or a combination thereof," when used in a list of two or more items, means that any one of the listed items can be employed by itself, or any combination of two or more of the listed items can be employed. For example, if a composition is described as containing components A, B, C, or a combination thereof, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is, A and B and C) or any of these in any combination thereof.

The previous description of the disclosure is provided to enable any person having ordinary skill in the art to make or use the disclosure. Various modifications to the disclosure will be readily apparent to a person having ordinary skill in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
   at least one processor; and
   at least one memory coupled to the at least one processor, wherein the at least one processor is configured to:
   receive a system information block (SIB) message that indicates a timing advance configuration associated with timing advance adjustment, wherein the timing advance configuration is associated with a granularity of the timing advance adjustment; and
   transmit, during a radio resource control (RRC) inactive state, a first message of a two-step random access channel (RACH) procedure, wherein a timing advance of the first message is based on the timing advance configuration.

2. The apparatus of claim 1, wherein:
   the at least one processor is further configured to measure, based on a synchronization signal block (SSB), the SIB, an RRC signaling, a reference signal (RS), a reference signal receive power (RSRP) or a signal to noise ratio (SNR), and
   the timing advance of the first message is based on the measured RSRP or the measured SNR.

3. The apparatus of claim 1, wherein the timing advance of the first message is based on a duplexing mode associated with transmission of the first message.

4. The apparatus of claim 1, wherein the at least one processor is further configured to apply the timing advance of the first message associated with the timing advance configuration to a preamble of the first message, to a payload of the first message, or a combination thereof.

5. The apparatus of claim 1, wherein the timing advance configuration further indicates a range of the timing advance adjustment.

6. The apparatus of claim 5, wherein the timing advance configuration includes an index mapped to at least one of the granularity of the timing advance adjustment or the range of the timing advance adjustment.

7. The apparatus of claim 5, wherein:
   the range of the timing advance adjustment is based on an RRC inactive state.

8. The apparatus of claim 5, wherein:
   the apparatus corresponds to a user equipment (UE), and the range of the timing advance adjustment, the granularity of the timing advance adjustment, or both are based on a carrier frequency range, wherein the carrier frequency range includes Frequency Range 1 (FR1) or Frequency Range 2 (FR2).

9. The apparatus of claim 1, wherein the at least one processor is further configured to:
   receive a reference signal (RS);
   estimate downlink (DL) timing based on the received RS; and
   determine the timing advance of the first message based on the estimated DL timing.

10. The apparatus of claim 5, wherein the range of the timing advance adjustment is based on a cell coverage characteristic.

11. The apparatus of claim 1, wherein the at least one processor is further configured to:
    determine the timing advance of the first message based on the timing advance configuration, a carrier frequency range, and a duplexing mode associated with transmission of the first message, wherein the first message is transmitted based on the determined timing advance of the first message.

12. The apparatus of claim 1, wherein the at least one processor is further configured to:
    apply a first TA associated with the timing advance configuration to a preamble of the first message; and
    apply a second TA associated with the timing advance configuration to a payload of the first message.

13. The apparatus of claim 12, wherein first and second TA are the same.

14. The apparatus of claim 12, wherein first and second TA are different.

15. The apparatus of claim 14, wherein the first TA applied to the preamble of msgA is based on the granularity.

16. The apparatus of claim 14, wherein the second TA applied to the payload of msgA is a based on the granularity.

17. The apparatus of claim 12, wherein a timing gap between the preamble and the payload of the first message comprises a tuning gap (Tg).

18. The apparatus of claim 17, wherein a transmit start time of the payload of the first message is based on the tuning gap and the second TA.

19. A method of wireless communication performed by an apparatus, the method comprising:
    receiving a system information block (SIB) message that indicates a timing advance configuration associated with timing advance adjustment, wherein the timing advance configuration is associated with a granularity of the timing advance adjustment; and
    transmitting, during a radio resource control (RRC) inactive state, a first message of a two-step random access channel (RACH) procedure, wherein a timing advance of the first message is based on the timing advance configuration.

20. The method of claim 19, further comprising:
    measuring, based on a synchronization signal block (SSB), the SIB, an RRC signaling, a reference signal (RS), a reference signal receive power (RSRP) or a signal to noise ratio (SNR), wherein the timing advance of the first message is based on the measured RSRP or the measured SNR.

21. The method of claim 19, wherein the timing advance of the first message is based on a duplexing mode associated with transmission of the first message.

22. The method of claim 19, further comprising applying the timing advance of the first message associated with the timing advance configuration to a preamble of the first message, to a payload of the first message, or a combination thereof.

23. The method of claim 19, wherein the timing advance configuration further indicates a range of the timing advance adjustment.

24. The method of claim 23, wherein the timing advance configuration includes an index mapped to at least one of the granularity of the timing advance adjustment or the range of the timing advance adjustment.

25. The method of claim 23, wherein:
the range of the timing advance adjustment is based on an RRC inactive state, a cell coverage characteristic, or a combination thereof.

26. The method of claim 23, wherein the range of the timing advance adjustment, the granularity of the timing advance adjustment, or both are based on a carrier frequency range.

27. The method of claim 19, further comprising:
receiving a reference signal (RS);
estimating downlink (DL) timing based on the received RS; and determining the timing advance of the first message based on the estimated DL timing.

28. The method of claim 19, further comprising:
apply a first TA associated with the timing advance configuration to a preamble of the first message; and
applying a second TA associated with the timing advance configuration to a payload of the first message.

29. An apparatus for wireless communication, the apparatus comprising:
at least one processor; and
at least one memory coupled to the at least one processor, wherein the at least one processor is configured to:
transmit, to a user equipment (UE), a system information block (SIB) message that indicates a timing advance configuration associated with timing advance adjustment, wherein the timing advance configuration is associated with a granularity of timing advance adjustment; and
receive, from the UE during a radio resource control (RRC) inactive state of the UE, a first message of a two-step random access channel (RACH) procedure, wherein a timing advance of the first message is based on the timing advance configuration.

30. The apparatus of claim 29, wherein the apparatus is a base station, and wherein the at least one processor is further configured to:
generate timing control information based on an RRC-state dependent configuration for the first message; and
transmit a second message of the two-step RACH procedure, wherein the second message includes information indicative of the timing control information.

31. The apparatus of claim 29, wherein, to transmit the timing advance configuration associated with the timing advance adjustment, the at least one processor is configured to transmit, to the UE, a system information block (SIB) that indicates the timing advance configuration.

32. The apparatus of claim 29, wherein:
the timing advance configuration further indicates a range of the timing advance adjustment.

33. The apparatus of claim 32, wherein:
the granularity of the timing advance adjustment is based on a subcarrier spacing of a physical uplink shared channel (PUSCH) of the first message,
the range of the timing advance adjustment is based on an RRC inactive state, a cell coverage characteristic, or a combination thereof.

* * * * *